United States Patent [19]

Gillis, Jr. et al.

[11] Patent Number: 4,794,129

[45] Date of Patent: Dec. 27, 1988

[54] REACTION INJECTION MOLDING COMPOSITIONS

[75] Inventors: Herbert R. Gillis, Jr., Sterrebeek; Malcolm P. Hannaby, Louvain, both of Belgium

[73] Assignees: ICI Americas Inc., Wilmington, Del.; Imperial Chemical Industries PLC, London, England

[21] Appl. No.: 160,647

[22] Filed: Feb. 26, 1988

Related U.S. Application Data

[63] Continuation-in-part of Ser. No. 105,641, Oct. 6, 1987, abandoned.

[30] Foreign Application Priority Data

Mar. 11, 1987 [GB] United Kingdom ............... 8705801

[51] Int. Cl.$^4$ ............................................. C08G 18/14
[52] U.S. Cl. ................................... 521/121; 521/129; 521/130; 521/163; 252/182.13; 252/182.23; 528/44; 528/48; 528/49; 528/57; 528/73; 528/76
[58] Field of Search ............... 521/121, 129, 130, 163; 528/44, 48, 49, 57, 73, 76; 252/182.13, 182.23

[56] References Cited

U.S. PATENT DOCUMENTS

| | | | |
|---|---|---|---|
| 3,682,867 | 8/1972 | Shackelford et al. | 260/47 |
| 3,789,045 | 1/1974 | Coury et al. | 260/47 |
| 3,892,696 | 7/1975 | Wood | 260/47 |
| 3,897,585 | 7/1975 | Wood | 428/395 |
| 4,218,543 | 8/1980 | Weber et al. | 521/117 |
| 4,554,299 | 11/1985 | Liggett | 523/466 |

FOREIGN PATENT DOCUMENTS

| | | |
|---|---|---|
| 0149765 | 7/1985 | European Pat. Off. |
| 1286246 | 8/1972 | United Kingdom |

OTHER PUBLICATIONS

Bock et al., "New Developments in Polyketimine-Polyisocyanate Chemistry and Their Application", ACS-PMSE Preprints; Fall, 1986 Meeting; pp. 448–456.

Primary Examiner—Maurice J. Welsh
Attorney, Agent, or Firm—James T. Jones

[57] ABSTRACT

Polymers having substituted urea groups, and molded objects therefrom, can be made by reacting, in a reaction injection molding (RIM) process, a composition comprising (A) a polyisocyanate and (B) a mixture comprising an imino functional resin and a chain extender. The chain extender may also be imino functional.

91 Claims, No Drawings

REACTION INJECTION MOLDING COMPOSITIONS

This is a continuation in part of copending application Ser. No. 105,641, filed on Oct. 6, 1987 now abandoned.

FIELD OF THE INVENTION

This invention relates to compositions of matter used as reaction systems to make moldings by a reaction injection molding (RIM) process. The systems are useful for the production of polymeric materials, specifically molded articles. The molded polymeric articles comprise the product of the direct reaction of an aromatic isocyanate with an imino-functional isocyanate-reactive composition.

BACKGROUND OF THE INVENTION

Reaction injection molded polyurea elastomers currently define an advanced state of the art in RIM technology. These polymeric materials are molded from reaction systems which generally consist of two components, a polyisocyanate (which is usually aromatic), and a mixture of aromatic and aliphatic polyamines. The polyureas represent a major technological advance over earlier types of RIM systems (i.e. polyurethanes, urethane ureas, and polyamides) in that they offer a combination of superior material properties (i.e. heat resistance, moisture resistance, dimensional stability), with improved productivity (i.e. shorter mold-residence times).

Conventional polyurea reaction injection molding (RIM) elastomer formulations are well known to the art. See, for example, U.S. Pat. Nos. 4,433,067, 4,396,729, 4,474,901, 4,444,910, 4,448,904, and European published patent application No. 0081701.

These polyurea RIM systems are "fast" systems in that they tend to gel early. They do not fill large, geometrically complex molds without very high injection rates. Because of the fast gel times flow/fill problems frequently arise and can be particularly severe with formulations having theoretical hardblock levels above about 35% and containing primary aliphatic amines in the formulation. In particular, formulations above 35% hardblock which contain aliphatic amine-terminated polyether resins as the source of the softblock, or as added chain extenders, can present difficult processing problems. Formulations containing such aliphatic amine-terminated polyether resins are widely used in state of the art polyurea RIM technology.

In general, state-of-the-art polyurea systems which contain primary aliphatic amine groups exhibit poorer flow/fill characteristics than older prior art polyurethane-urea RIM systems, such as that described in U.S. Pat. No. 4,218,543. These older systems are similar to state-of-the-art polyurea systems in that they contain a sterically hindered aromatic diamine as a principal chain extender, but they do not generally require or contain primary aliphatic amine-containing species. Consequently not only do these older prior art systems exhibit better flow-fill characteristics, they generally also exhibit better mixing and are usually less demanding to process than current generation polyurea systems (i.e., when compared under similar conditions and at the same hardblock levels).

Conversely, apart from the disadvantages described above, state-of-the-art polyurea systems have several advantages over prior art polyurethane-urea systems. In particular they generally exhibit lower mold residence times, hence better productivity, and better physical properties can be obtained with the polyureas. In addition, the polyureas are more "robust", i.e. they can tolerate acidic additives because they do not depend upon sensitive catalysts as do the polyurethaneureas. The polyureas, as known in the art, are distinguished from the polyurethaneureas most fundamentally by the fact that substantially no urethane linkages are formed during the reaction injection molding (RIM) operation.

It would be desirable to have polyurea RIM systems which exhibit flow-fill and mixing characteristics which are better than those of existing polyureas and, preferably, at least comparable to prior-art polyurethaneurea systems. Speaking more generally, it would be highly desirable to have RIM processable reaction systems which offer at least some of the advantages of polyureas (i.e. heat resistance, robustness, short mold-residence times), without the disavantages characteristic of the known polyurea systems (poor flow).

It would be preferable, however, that this improvement in flow not be achieved at the expense of much longer mold residence times. The requirements for improved flow/fill characteristics and constant mold-residence time are mutually contradictory unless the reaction profile of such systems is changed. Simply reducing reactivity tends to decrease the flow/fill problems which naturally stem from the fast gel times of state-of-the-art polyurea systems, but also disadvantageously tends to increase the minimum necessary mold residence time.

State-of-the-art polyurea systems are faster than the earlier polyurethane-urea systems for a number of reasons, one being, as mentioned, the presence of fast-reacting primary aliphatic amine species which can react with aromatic isocyanates more than 100 times faster than aromatic amine chain extenders, such as diethyl toluene diamine, DETDA, normally used in polyurea and polyurethane urea RIM systems. State of the art polyureas generally have a higher cohesive energy density (CED), hence higher Tg, than corresponding polyurethaneureas of the prior art. The higher CED, coupled with higher chemical reactivity, make the polyureas gel faster than polyurethaneureas. Often the gels which are first formed are physical rather than chemical gels. Physical gelation can be particularly problematic in polyurea systems which contain relatively high concentrations of aliphatic amine species, especially lower molecular weight aliphatic amine species. In polyurea systems which form distinct two-phase elastomers, phase separation may further interfere with flow/fill and mixing. Phase separation can occur very early if reactivity is high.

SUMMARY OF THE INVENTION

This invention provides reaction systems for use in making polymers by the reaction injection molding process, said system comprising the following reaction components:

(A) an organic aromatic polyisocyanate: and (B) an isocyanate-reactive composition comprising at least one imino-functional compound which has at least one imino group that is directly reactive towards isocyanates and which conforms to the following structure

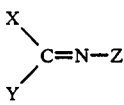

wherein

X, Y, and Z are chemical moieties which collectively form the rest of said compound and are each independently selected from the group consisting of H and organic radicals which are attached to the imino unit

of said compound through N, C, O, S, Si or P;

the central carbon atom of said imino unit is bonded to three atoms; and said system is used to make a polymer by impingement mixing a stream comprising said reaction component (A) and a stream comprising said reaction component (B).

In the above reaction system, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through an atom selected from C, N, and O. It is most preferred that X, Y and Z are attached through saturated atoms, preferably aliphatic carbon atoms. It is also preferred that component (B) constitute at least 20% by weight of all reactive components in the system, and that the imino-functional compounds constitute at least 5%, preferably at least 8%, by weight of the total reaction system.

In a preferred embodiment this invention provides a reaction system used to make polymers by a reaction injection molding process, comprising (A) an aromatic polyisocyanate which has a number-averaged isocyanate functionality of from about 1.8 to about 4.0 and a number-averaged molecular weight of from about 120 to about 1800, wherein more than 50 mole percent of the reactive isocyanate (—NCO) groups of said polyisocyanate are bonded directly to aromatic rings and at least 50 mole percent of the species comprising said polyisocyanate are diisocyanates; and B. an isocyanate-reactive composition comprising
  (i) a chain extender comprising
    (a) 0-100% of an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and, correspondingly,
    (b) 100-0% of an imino-functional compound having a number-averaged molecular weight less than 1500 and a number-averaged functionality of isocyanate-reactive imino units of about 1 to about 3, and
  (ii) an imino-functional polyether resin having an average of from about 1.1 to about 5 isocyanate-reactive imino groups per molecule and a number-averaged molecular weight of from 1500 to about 10,000, wherein said imino groups constitute at least 50 mole percent of the isocyanate-reactive groups in said polyether resin, and at least 50 mole percent of said imino-functional polyether species contain two or more imino (C=N) groups per molecule:

wherein said system is used to make a polymer by impingement mixing a stream comprising said reaction component (A) and a stream comprising said reaction component (B).

It is within the scope of the invention to have reactant B(ii) assume any weight fraction of the total B component. It is preferred, however, that the weight ratio of reactant B(i) to reactant B(ii) be in the range of about 9:1 to about 1:9, and most preferred that this ratio be in the range of 8:2 to 2:8.

It is preferred that the weight ratio of chain extender component B(i)(b) to chain extender component B(i)(a) be between about 0 and about 10, preferably between 0.1 and 5, and most preferably between 0.25 and 2.

It is further within the scope of the invention to use a softblock component, B(ii) which is not imino functional in conjunction with an imino functional chain extender, or to pre-react the (imino functional or non-imino functional) softblock component with a stoichiometric excess of the polyisocyanate "A" component, thereby forming an isocyanate-terminated prepolymer. In such an embodiment this invention provides a RIM reaction system comprising:

A. an aromatic polyisocyanate which has a number averaged isocyanate functionality of from about 1.8 to about 4.0 and a number-averaged molecular weight of at least about 120, wherein more than 50 mole percent of the reactive isocyanate (—NCO) groups of said polyisocyanate are bonded directly to aromatic rings and at least 50 mole percent of the species comprising said polyisocyanate are diisocyanates; and B. an isocyanate-reactive composition comprising
  (i) a chain extender comprising an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and
  (ii) an imino-functional chain extender having a molecular weight less than about 600 and a number-averaged functionality of imino units between about 1 and about 2.5, said imino groups being capable of reacting directly with isocyanates, wherein the ratio by weight of component B(i) and B(ii) being between about 1:9 and about 9:1.

In a preferred embodiment this invention also provides a substantially moisture-free isocyanate-reactive composition comprising the following isocyanate-reactive components (i) an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines; and (ii) an imine-terminated aliphatic polyether having an average of from about 1.1 to about 4 imine

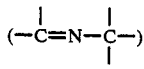

groups per molecule and a number-averaged molecular weight of from about 1500 to about 10,000, wherein said imine groups are capable of reacting directly with isocyanates, and wherein said imine groups constitute at least 50 mole percent of isocyanate-reactive functional groups in said polyether and at least 50 mole percent of the imine-terminated species comprising said mixture are di-imines and/or tri-imines, the weight ratio of said reactant (i) to said reactant (ii) being in the range of about 9:1 to about 1:9.

Another embodiment according to this invention provides a chain extender mixture, component B(i), comprising an aromatic polyamine and an iminofunctional chain extender capable of reacting directly with isocyanates, wherein said chain extender contains at least one isocyanate reactive imino ( C=N ) unit per molecule and has a number-averaged molecular weight less than 1500, preferably between about 100 and about 600, wherein the reactive imino groups conform to the range of structures defined hereinabove, and wherein the ratio by weight of said imino functional chain extender to said aromatic polyamine in component B(i) is preferably between about 9:1 and 1:9, more preferably between 8:2 and 2:8. In a preferred embodiment the imino groups of said imino functional chain extender are simple imines.

This invention further provides polyureas and molded articles made therefrom using the reaction systems and isocyanate-reactive compositions noted aoove.

"Reaction System" as used herein means a system or assemblage of reaction components which, in the system, are unreacted but which, in use, are reacted with each other in a device which provides for impingement mixing, to form a molded product.

"RIM" as used herein refers to a reaction injection molding process wherein the reactants, present as a polyisocyanate "A" component and an isocyanate-reactive "B" component, are impingement mixed and injected into a closed mold.

"Moistuee free conditions" and "moisture free" as used above means that the reactants employed are substantially anhydrous and that the processing equipment used is also substantially anhydrous.

"Polymer", as used herein and in the claims, means the reaction product of a reaction system according to this invention. Such polymers contain at least one moiety or portion derived from the reaction of an isocyanate group with an imino group. Such polymers can also contain other groups or likages such as urethane, biuret, allophanate, triazine, and or isocyanurate groups.

"Directly reactive" as applied to the imino functional compounds useful herein means that the imino groups are capable of reacting with aromatic isocyanate groups in such a way as to form at least one chemical bond between the groups without prior cleavage or hydrolysis of the imino groups. Hence, no byproducts are produced in the reaction. The site of bond formation may be at either of the atoms of the imino unit, the atoms attached directly to the imino unit, or both.

The term "polyisocyanate" encompasses mixtures comprising two or more species of isocyanate, as well as compositions consisting of a single polyisocyanate species. The terms "an aromatic polyamine", "an imine-terminated aliphatic polyether" and "an imino-functional chain extender" are used in like manner, i.e. to denote mixtures of species as well as single species thereof.

The terms "alkyl", "alkylene", and "aliphatic" used herein refer to cyclic as well as acyclic non-aromatic organic structures, i.e., structures or molecules which are free of aromatic rings and not part of aromatic rings.

"Imino-functional" as used herein means that a reactant contains the imino group

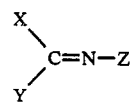

as defined above, wherein said group is capable of reacting directly with isocyanate groups. Preferred classes of imino-functional groupings include imines, oxazolines, imidazolines, N-alkyl imidazolines, oxazines, diazines, imino-esters, amidines, imidines, isoureas and guanidines, as hereinafter further defined.

Molecular weights referred to herein above about 400 to 500 can be determined for all compound by gel permeation chromatography. For lower molecular weight active hydrogen compounds, titration (direct with acids such as HCl or $HNO_3$ for amines, back titration with KOH for polyols) can be used and is well known. Direct acid titration can also be used for (low or high) imino-compound molecular weight determination.

The reaction systems of this invention are generally processed in bulk to form a solid polymer in a single step from the liquid monomeric components A and B. Generally, no solvent is used to moderate reaction rate. This does not, however, preclude the use of certain ingredients normally used in the processing of bulk thermosetting polyurethanes, polyureas, and related isocyanate-derived polymers of the prior art which are also prepared by impingement mixing. These additives are known to those skilled in the art, and includes monomeric liquids such as plasticizers, flame retardants, catalysts, volatile blowing agents and the like.

The range of imino functional reagents which may be used in the invention are not limited by or to any particular chemistry for the preparation of said reagents. For example, imine terminated aliphatic polyethers may be made by a number of different routes. Specifically, the amine groups ($-NH_2$) of an aliphatic amine-terminated polyether can be prereacted with an aldehyde ($RCH_2CHO$) or a ketone ($R^1-CO-R^2$) to form, respectively, the corresponding aldimine

or the corresponding ketimine

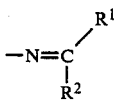

wherein R, $R^1$, and $R^2$ are hereinafter subsequently defined, or the aldehyde and/or ketone groups, of an aldehyde and/or ketone-terminated polyether, can be prereacted with an aliphatic primary mono-amine to form, respectively, the corresponding aldimine and/or ketimine-terminated polyethers:

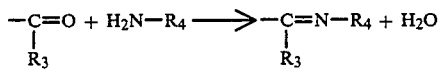

wherein: $R_3$=H or alkyl, $R_4$=H or alkyl, $R_3$ and $R_4$ being more fully defined hereinafter.

The direct reaction of compounds containing isocyanate groups with compounds containing imine groups is known, see "New Developments in Polyketimine-Polyisocyanate Chemistry and Their Application"; ACS-PMSE preprints: Fall-1986 meeting; pp 448–456, U.S. Pat. No. 3,789,045 and GB patent No. 1286246. It is also known to react polyisocyanates with polyamines in a reaction moderating solvent such as ketone or aldehyde solvents, see U.S. Pat. No. 3,892,696 to Wood and U.S. Pat. No. 3,897,585 (also to Wood) which is a Continuation-in-part thereof. It is also known to react aliphatic polyisocyanates with mixtures of polyamines and polyimines as disclosed in U.S. Pat. No. 4,554,299 to Ligget. It is also well known to react polyisocyanates with polyimines in the presence of moisture whereby the purpose of the moisture is to hydrolyze the imine and liberate free amine which in turn reacts with the isocyanate present. This indirect process of reacting polyimines and polyisocyanates is described, for example, in European patent No. 149,765 to Arendt. It is not useful for RIM. Such indirect reactions are outside the scope of this invention.

So far as the inventors are aware, the prior art does not disclose the reaction, of an aromatic polyisocyanate with a mixture comprising an aromatic polyamine and an aliphatic imine-terminated polyether (or other types of imino-functional species), nor the unique suitability of this reaction for use in a reaction injection molding process. Speaking more generally, the direct reaction of imino-functional species with isocyanates in a RIM process does not appear to have been explored in the prior art.

DETAILED DESCRIPTION

It has now been found, surprisingly, that at least some of the imino functional reactants herein have a much more desirable reactivity profile than the amines (particularly primary aliphatic amines) now used in polyurea RIM. Specifically, the imines in question do not begin reacting rapidly with aromatic isocyanates at the point of mixing (as do the amines conventionally used). Instead, there is an induction period of short duration, typically about one to about three seconds, during which the reaction to form a polymer does not occur or is very slow. This induction period is followed by a very sudden and rapid reaction. This type of two-stage reaction profile is ideal for RIM because mixing and filling can be accomplished during the induction period and the sudden, rapid, polymerization which follows permits a very short mold residence time. The reaction of the imines used in this invention with aromatic isocyanates is "direct". No volatile or monomeric by-products are formed in the reaction. The imines are generally low viscosity materials, which enable them desirably to act as flow modifying agents during the induction period.

"A" Component

Polyisocyanates

The organic polyisocyanates, component (A), useful in this invention have a number-averaged isocyanate functionality from 1.8 to 4.0, preferably from 1.9 to 2.3, and a number-averaged molecular weight between about 120 and about 1800, preferably between about 170 and about 800. At least 50 mole percent, preferably at least 90 mole percent, of isocyanate groups in the species comprising the polyisocyanate are bonded directly to aromatic rings. At least 50 mole percent, preferably at least 70 mole percent, of the species comprising the polyisocyanate are diisocyanates.

Suitable aromatic polyisocyanates include, for example, p-phenylene diisocyanate; m-phenylene diisocyanate; 2,4-toluene diisocyanate; 2,6-toluene diisocyanate; naphthalene diisocyanate; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 3,3'-dimethyl-4,4'-biphenylene diisocyanate; polydiphenylmethane diisocyanate having a functionality greater than 2, mixtures thereof and the like. The MDI isomers (2,4' and 4,4') and mixtures and derivatives thereof are most preferred.

The polyisocyanate may include minor amounts of aliphatic polyisocyanates. Suitable aliphatic polyisocyanates include isophorone diisocyanate; 1,6-hexamethylene diisocyanate; 1,4-cyclohexyl diisocyanate; saturated analogues of the above mentioned aromatic polyisocyanates, mixtures thereof and the like.

Suitable uretonimine-modified polyisocyanates can be used and are prepared by a process wherein an aromatic polyisocyanate is heated to a temperature exceeding the melting temperature of the polyisocyanate, for example, 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate-terminated prepolymers can be used and are prepared by reacting an excess of polyisocyanate with polyols, which may include aminated polyols. Suitable polyols include, for example;

(a) polyether polyols and/or hydrocarbon-based polyols having a molecular weight from 60 to 400, and an average hydroxyl functionality from 1.9 to 2.5;

(b) polyether (and/or thioether) polyols having a molecular weight of at least 400, preferably 1000 or higher, and an average hydroxyl functionality from 1.9 to 4;

(c) polyester polyols having a molecular weight from 100 to 1000, and an average hydroxyl functionality from 1.9 to 2.5;

(d) polyester polyols having a molecular weight greater than 1000, and an average hydroxyl functionality from 1.9 to 4:

(e) amine terminated polyethers having a molecular weight of at least 1000, and an average amine hydrogen functionality from 1.9 to 8.

Examples of suitable polyether or hydrocarbon polyols having a molecular weight from 60 to 400 include propylene glycol; dipropylene glycol; tripropylene glycol; 2,3-butanediol; 1,3-butanediol, 2,2-dimethyl-1,3-propanediol and polypropylene glycols.

Examples of suitable polyether polyols having a molecular weight of at least 400, preferably 1000 or higher, include polyethylene glycols; polyoxyethylene polyoxypropylene copolymer diols; and polytetramethylene glycols, higher polypropylene glycols, polyoxypropylene triols, etc. The polyoxypropylene based polyols are preferred.

Examples of suitable polyester polyols having a molecular weight from 100 to 1000 include aliphatic polyester diols, and aromatic polyester diols. These polyester diols are obtained from the reaction of dibasic carboxylic acids such as succinic, adipic, suberic, azelic, phthalic, isophthalic, and the like, with alkylene glycols and oxyalkylene glycols to form the corresponding polyalkylene, and polyoxyalkylene ester diols or copolymers thereof. Examples of suitable polyester polyols having a molecular weight of at least 1000 include the polyester diols and triols obtained from the reaction of polybasic carboxylic acids, and alkylene polyols and/or oxyalkylene polyols, to form the corresponding polyalkylene and polyoxyalkylene esters or copolymers thereof having a molecular weight of at least 1000. The polybasic carboxylic acids used may be aliphatic, aromatic, or both.

Mixtures of several species from the above (a)–(e) and the like may be used to prepare prepolymers for use in the A component. Mixtures of species of type (b) with species of type (e) are preferred.

Examples of suitable amine terminated polyethers having a molecular weight of at least 1000 include polypropylene oxide triamines, polyoxypropylene diamines, and polyoxyethylene/polyoxypropylene copolymer diamines and triamines.

It is preferred that the (A) stream component contain a "softblock" prepolymer, i.e. a high (1000 or higher) molecular weight polyether and/or polyester segment. It is preferred that at least about one third, preferably at least 40%, by weight of the total softblock in the polymer be derived from the (A) component. High molecular weight aliphatic polyether species (i.e., categories (b) and/or (e) above) are preferred, particularly if the molecular weight of the species is about 2000 to 6000 and the reactive functionality is about 2 to about 8. The (A) stream can contain a carboxylic acid (e.g. a fatty acid such as lauric, stearic, palmitic, oleic, and the like) or latent acid (e.g. an anhydride of any of the preceding acids or cyclic acid anhydrides, such as cis-1,2-cyclohexane-dicarboxylic acid anhydride) to promote the reaction between the polyisocyanate and aliphatic imino-functional ingredients from stream (B). The level of such acids can be about 0.01 to 4% by weight of the total polymer. The range of total softblock content in the polymer material (as a percent by weight of the total polymer) may range from about 10 to about 95%, preferably 20 to 80%, and most preferably 30 to 70%.

"B" Component—General

The B component of this invention is an isocyanate-reactive composition which comprises at least one imino-functional compound capable of reacting directly with aromatic isocyanates (i.e. without prior cleavage of the C=N bond to form a monomeric byproduct), present as a softblock component and/or as a chain extender. If an imino-functional compound is present as a chain extender, it will in general be an imino-functional compound having a molecular weight less than 1500, preferably less than 600. If an imino-functional compound is to be used in the softblock (or rubbery phase), it will in general be an imino-functional aliphatic polyether resin with a molecular weight of at least 1500, preferably 2000 to 8000, and a number-averaged functionality of imino (C=N) groups at least 1.1, preferably from about 2 to about 4.

Many types of imino-functional compounds are useful in this invention, including (but not limited to) those listed in Table A, following:

TABLE A

| Structure | TYPE |
|---|---|
| $\text{P}-R^5-\underset{\underset{R^6}{\mid}}{C}=N-R^7$ | Simple imine |
| $\text{P}-R^5-O-\underset{\underset{R^6}{\mid}}{C}=N-R^7$ | Imino ester |
| $\text{P}-Ar-O-\underset{\underset{R^6}{\mid}}{C}=N-R^7$ | Imino ester (aromatic) |
| $\text{P}-R^5-N=\underset{\underset{R^7}{\mid}}{\overset{\overset{R^6}{\mid}}{C}}$ | Simple imine |
| $\text{P}-R^5-NR^6-\underset{\underset{R^7}{\mid}}{C}=N-R^8$ | Amidine |
| $\text{P}-R^5-N=C\underset{Ar'}{\overset{R^6}{\diagup}}$ | Simple imine (aromatic) |
| $\text{P}-R^5-NR^6-\underset{\underset{R^7}{\mid}}{C}=N-Ar'$ | Amidine (aromatic) |
| $\text{P}-R^5-\underset{\underset{OR^7}{\mid}}{C}=N-R^6$ | Imino ester (aliphatic) |
| $\text{P}-R^5-\underset{\underset{OAr'}{\mid}}{C}=N-R^6$ | Imino ester (aromatic) |
| $\text{P}-R^5-NH-\underset{\underset{NHR^6}{\mid}}{C}=NR^6$ | Guanidine |
| $\text{P}-R^5-NR^7-C\underset{NR_2^8}{\overset{NR^8}{\diagup\!\!\!\diagup}}$ | Guanidine |
| $\text{P}-R^5-NH-\underset{\underset{NHAr'}{\mid}}{C}=NAr'$ | Guanidine (aromatic) |
| $\text{P}-R^5-O-\underset{\underset{NHR^6}{\mid}}{C}=N-R^6$ | Isourea |
| $\text{P}-R^5-O-\underset{\underset{NH_2}{\mid}}{C}=N-R^7$ | Isourea | wherein:

$R^5$ and Ar are divalent aliphatic and aromatic organic linking groups, respectively;

Ⓟ represents a polyether or hydrocarbon chain or radical, to which said imino (C=N) functional group is attached as indicated by the drawings.

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R_5$ may in particular be propylene, Ar methoxyphenylene, $R_6$ propyl, $R_7$ propyl, $R_8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy N,N-dialkylamino etc.

The preparation of these imino functional groups in both cyclic and acyclic forms is well known in the literature.

Isoureas are generally prepared by the reaction of an alcohol with a carbodiimide in the presence of a suitable catalyst. The alcohol component may be aliphatic, as described in E. Schmidt, F. Moosmuller, Lieb. Ann. 597, 235, (1956), or aromatic as in E. Vowinkel, Chem. Ber., 96, 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H. G. Khorana, Canad. J. Chem. 32, 261, 1953.

Guanidines can be prepared by the reaction of an amine with a carbodiimide in a manner similar to that outlined in the references cited above. Alternatively alkylguanidines may be prepared by the reaction of an alkylamine salt with dicyandiamide as in E. A. Werner, J. Bell, J. Chem. Soc., 121, 1790, (1922). In yet another method s-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates.

The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3,630,996 to D. Tomalia, U.S. Pat. No. 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous tetrahydropyrimidines can be achieved in a similar manner by the use of 1,3-propanediamine as the diamine component. Specific methods are described in "The Chemistry of Heterocyclic Compounds: The Pyrimidines, Supplement I", Ed. A. Weissberger and E. C. Taylor, author D. J. Brown, Interscience Publishers, New York, 1953.

The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

"B" Component—Chain Extenders

Component (B)(i) useful herein is in general a chain extender. Preferred chain extenders include aromatic polyamines, imino-functional aliphatic or aromatic compounds having a molecular weight less than 1500, and mixtures thereof.

Aromatic polyamines useful as chain extenders in this invention have a number-averaged functionality of aromatically bound primary and/or secondary isocyanate reactive amine groups of from about 1.8 to about 3.0, preferably from 1.9 to 2.2, and a number averaged molecular weight which ranges from about 100 to about 400, preferably between 122 and 300. At least about 50 mole percent, preferably at least 80 mole percent, of the species comprising said polyamine are diamines. Preferably, at least about 95 mole % of amine groups, whether primary or secondary, are aromatically bound.

Examples of suitable aromatic polyamines include 3,5-diethyl-2,4-toluenediamine; 3,5-diethyl-2,6-toluenediamine; DETDA which is a mixture of about 80 percent by weight 3,5-diethyl-2,4-toluenediamine and about 20 percent by weight 3,5-diethyl-2,6-toluenediamine; 1,3,5-triethyl-2,6-diaminobenzene; 2,4-diaminotoluene; 2,6-diaminotoluene; 2,4'-diaminodiphenylmethane; 4,4'-diamino-diphenylmethane; 3,3'-dimethyl-5,5'-diethyl-4,4'-diaminodiphenylmethane; 3,3',5,5'-tetraisopropyl-4,4'-diamino diphenyl-methane polyphenyl-polymethylene polyamines; and the like.

It is also possible to employ, in component B(i), in addition to or in place of the aromatic polyamines noted above, between 0 and 100% by weight, based on the total weight of B(i), of low molecular weight imino-functional species having a molecular weight less than 1500 wherein each such imino-functional species contains at least one imino unit per molecule. Preferably such imino-functional species have a number-averaged molecular weight less than 600, a number-averaged functionality of imino units between about 1.2% and about 2.5, wherein each imino unit is bonded to aliphatic and/or aromatic groups X, Y and Z. Examples of preferred compounds are aliphatic polyether resins terminated with aliphatic imine groups which can be made in facile manner by reacting a commercially available low molecular weight amine-terminated polyether resin such as JEFFAMINE® D-400 or JEFFAMINE® D-230 with an aldehyde or ketone to form, respectively, the corresponding aldimine or ketimine. Other examples include simple bis-ketimines or bis-aldimines of 1,6-hexamethylene diamine, isophorone diamine, menthane diamine, and the like; bis-oxazolines, bis-thiazolines, or bis-imidazolines derived from adiponitrile or adipic acid, etc.

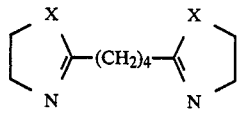

where X is O, S, NH, N—R, or N-Ar; R is a monovalent aliphatic organic group of 1 to 10 carbons and Ar is an aromatic organic group of 6 to 18 carbons.

Aliphatic low molecular weight polyamine compositions may also be employed, in minor amounts not exceeding 40% by weight based upon the total weight of ingredients B(i)+B(ii), preferably less than 20%, more preferably less than 10%, and most preferably less than 1%, as an optional chain extender in stream (B). Useful aliphatic amines contain acyclic, linear or branched chains of atoms between reactive (primary and/or secondary) amine groups. These amine groups (by definition) are bonded directly, via the amine nitrogen atom, to aliphatic carbon atoms of the connecting structure. The number-averaged molecular weight of the aliphatic polyamine (or mixture of aliphatic polyamines) used in this invention is less than about 1500, preferably between 200 and 450. The number averaged isocyanate-reactive amine functionality is between 1 and 3, preferably between 2 and 2.3. The aliphatic polyamine composition should preferably be at least 50 mole percent, preferably at least 70 mole percent, diamines.

It is preferred that the aliphatic amine composition be substantially free of individual (reactive amine-containing) molecular species of molecular weight less than 170. If molecular amine species of molecular weight lower than 170 are present, they should constitute less than 20% by weight of the total aliphatic amine composition, and less than 5% of the total polyurea composition (by weight, relative to the total weight of reactive components).

It is preferred that a majority of any primary aliphatic amine groups within the aliphatic amine composition, most preferably greater than 80% of these primary amine groups, are bonded directly (via the amine nitrogen atom) to secondary and/or tertiary carbon atoms.

Examples of suitable aliphatic polyamines include the amine-terminated polyethers such as those represented below:

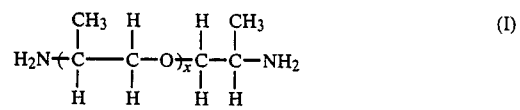

wherein x has an average value between 2 and about 6.

Polyether diamines such as Formula I, above, may be used as mixtures with higher functionality polyether polyamines such as Formula II (below), provided that the mixture meets the requirements of number averaged amine functionality and molecular weight described previously:

wherein z has an average value between about 1 and about 2.

"B" Component—Higher Molecular Weight Softblock Resin

The preferred imine-terminated polyethers used as component (B)(ii) herein can be made by reacting an aldehyde or ketone with an amine-terminated polyether. The aldehyde- or ketone-derived product is an irreversibly-formed imine which (along with the chain extender and the polyisocyanate) is reacted into the polyurea such that the polyurea contains urea linkages having substituted urea nitrogen atoms along the polymer backbone. Suitable amine-terminated polyethers are available commercially under the registered trademark JEFFAMINE from Texaco and include JEFFAMINE D-4000, a 4000 molecular weight primary amine terminated polypropylene oxide diamine; JEFFAMINE D-2000, a 2000 molecular weight primary amine terminated polypropylene oxide diamine; JEFFAMINE T-5000, a 5000 molecular weight primary amine terminated polypropylene oxide triamine; JEFFAMINE T-3000, a 3000 molecular weight primary amine terminated polypropylene oxide triamine; JEFFAMINE ED-2000, a 2000 molecular weight primary amine terminated polyoxypropylene polyoxyethylene copolymer diamine.

Another class of suitable aliphatic amine-terminated polyethers includes the following:

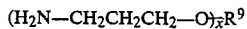

wherein $R^9$ is an organic polyfunctional structure containing aliphatic ether linkages (for example, polyoxypropylene chains). The size of $R^9$ is such that the molecular weight of the amine-terminated polyether resin is 1500 or higher (to a maximum of about 10,000). The functionality of $R^9$, (i.e. x), is preferably 2 or 3. Of course, mixtures of different species may be used if desired. Structures of the type shown immediately above may, for example, be made by cyanoethylation of polyether polyols (with acrylonitrile, or the like) and subsequent reduction (i.e. hydrogenation) of the nitrile end-groups to free primary aliphatic amines.

The polyether based resins used to prepare component B(ii) may also contain groups other than ether linkages. For example, amide linkages, thioether linkages, imide linkages, siloxane linkages, and so forth, provided that these are chemically inert towards the aliphatic imine end groups or other imino groups used.

Suitable aldehydes for making the preferred imine-terminated aliphatic polyethers have the formula

and suitable ketones have the formula

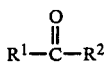

In the above R, $R^1$ and $R^2$ can be saturated aliphatic groups having 1-10 aliphatic carbon atoms and may contain aromatic unsaturation. In each case it is preferred that the carbon atom alpha to the carbonyl group in an aldehyde, and at least one carbon atom alpha to the carbonyl group in a ketone, be saturated. It is more preferred that both the carbon atoms alpha to the ketone carbonyl group be saturated. By "saturated", it is meant that the carbon atoms in question are bonded each directly to 4 atoms. At least one of the R groups adjacent to the carbonyl preferably contains at least one proton adjacent to the carbonyl group (for both aldehydes and ketones).

Suitable aldehydes include, for example, formaldehyde, acetaldehyde, propionaldehyde, n-butyraldehyde, isobutyraldehyde heptadehyde, α-methylvaleraldehyde, β-methylvaleraldehyde, caproaldehyde, isocaproaldehyde, cyclohexyl aldehyde, mixtures of these, and the like.

Suitable ketones include acetone, methyl ethyl ketone, methyl n-propyl ketone, diethyl ketone, methyl isopropyl ketone, benzyl methyl ketone, cyclohexanone, mixtures of these, and the like.

Suitable imine-terminated polyethers may also be prepared starting with the analogous polyether polyols, i.e. the hydroxyl-terminated analogues of the above amine-terminated polyethers. The hydroxyl-terminated polyethers can be oxidized to the ketone- or aldehyde-terminated species. The ketones can then be reacted with an aliphatic amine having one primary amine group. The polyamine can have 1-20 carbon atoms, preferably 1-10 carbon atoms. Simple aliphatic primary amines having 1-8 carbon atoms are most preferred, including methylamine, ethylamine, propylamine, n-butylamine, isobutylamine, cyclo hexylamine and hexylamine.

The reaction to form the imine-terminated polyether is facile, but it is important when making simple imines to remove substantially all water from the imine-terminated product and maintain (e.g. store) the product under anhydrous conditions. The reaction is conducted by combining the amine-terminated species with the carbonyl-containing species and heating until the imine-forming reaction is complete, typically 20 minutes to several hours, while providing for removal of the $H_2O$ formed during the reaction (i.e. by vacuum). If the amine-containing species is the amine-terminated polyether, the reaction is conducted using excess aldehyde and/or ketone. If a high-molecular weight polyether is the carbonyl- containing component, then an excess of the primary amine is preferably used, in order to insure imine formation.

Excess unconsumed volatile reactant (aldehyde or ketone or simple amine) is stripped from the product, whereby water formed during the reaction is also stripped so that the product is maintained anhydrous. With some volatile compounds such as acetone, it may be necessary to add a solvent such as toluene so that an azeotropic distillation can be effected or so that the boiling point approaches or exceeds that of water.

Many imino-functional compounds other than simple imines (e.g. oxazolines, guanidines, imidazolines, oxazines, imidines, diazines) are not moisture-sensitive and the presence of water during formation, processing, or storage of these imino groups has substantially no effect on their reaction.

If the reagent used in excess during the imine-forming reaction cannot be conveniently removed from the system after the reaction (i.e. by vacuum distillation, or some other separation technique), then the extent of the excess employed should be such that the amount of this unreacted material which is left in the imine-terminated polyether resin does not exceed about 5% by weight of the total resin, preferably not more than 2%, and most preferably less than 1%.

The aliphatic polyether product, imine-terminated as described above, preferably has a number-averaged imine functionality of from about 1.6 to about 3, and the imine groups comprise at least 50 mole percent, preferably at least 70 mole percent, of isocyanate-reactive functional groups present therein.

In a preferred embodiment, substantially all of the groups bonded to the polyether imine nitrogen or imine carbon are aliphatic, preferably saturated aliphatic. It is further preferred that the number-averaged molecular weight of the imine-terminated polyether softblock be between 2000 and 8000, and that the polyether be substantially free of components having a molecular weight less than about 1500. It is further preferred that at least 70 mole percent of the imine-terminated molecules comprising the polyether be di-imines and/or tri-imines.

In addition to the imino-functional polyethers described above, the reaction system stream (B) may also contain supplemental higher molecular weight isocyanate-reactive hydrogen-containing material. A preferred group of active hydrogen-containing materials useful as optional softblock resins have an average molecular weight of at least 1500, preferably at least 2000 up to about 100,000, an average active hydrogen group functionality from 2 to 6, preferably from 2 to 3, active hydrogen-containing groups wherein at least 70 percent, preferably at least 85 percent, of the groups are primary and/or secondary aliphatic and/or aromatic amine groups. The amount of these supplemental high-molecular-weight isocyanate-reactive materials in component B should be less than 50% by weight of the amount of component B(ii), preferably less than 25%, and most preferably less than 10%. The ratio of the number of active hydrogen containing groups in this supplemental high-molecular-weight resin to the number of imino groups in component B(ii) is less than 0.5, preferably less than 0.25, and most preferably less than 0.1:1.

Examples of suitable supplemental high molecular weight active hydrogen-containing materials include amine terminated polyethers, amine terminated organopolysiloxanes, amine terminated polymers with hydrocarbon main chain, amine terminated polyamides, and the like. Suitable amine terminated polyethers have a molecular weight of about 2000 to about 10,000, and are made from an appropriate initiator such as glycerol, ethylene glycol or trimethylolpropane, to which lower alkylene oxides such as ethylene oxide, propylene oxide, butylene oxide or mixtures thereof are added. The resulting hydroxyl terminated polyol is then aminated. When two or more oxides are used, they may be present as random mixtures or as blocks of one or the other polyether. Normally, the amination step does not completely replace all of the hydroxyl groups. For use in the invention, compounds having at least 70 percent of the hydroxyl groups converted to primary and/or secondary amine groups are preferred and those having at least 85 percent are most preferred. Amination of the polyol may be accomplished by a large number of prior art methods, for example, by reductive ammination or by cyanoethylation followed by hydrogenation of the nitrile end groups.

If it is desired to reductively amminate a polyethylene oxide polyol, it is desirable to cap the hydroxyl terminated polyol with a small amount of higher alkylene oxide so that the terminal hydroxyl groups are secondary hydroxyl groups. The polyols so prepared are then reductively aminated by prior art techniques, for example, as disclosed in U.S. Pat. No. 3,654,370, incorporated herein by reference.

A single high molecular weight amine terminated polyether may be used. Also, mixtures of amine terminated polyethers such as mixtures of di- and tri-functional materials and/or different molecular weights or different chemical composition materials may be used.

Suitable amine terminated organopoly siloxanes include, for example, those represented by the formula

where $R^{10}$ and $R^{11}$ independently are aryl groups or alkyl groups containing from 1 to 8 carbon atoms including methyl, ethyl, propyl, butyl, phenyl, pentyl, hexyl, octyl, or branched chains thereof, cyclobutyl, cyclopentyl, cyclohexyl, cycloheptyl, and cyclooctyl.

$R^{10}$ and $R^{11}$ may be the same or different, x and y have values from about 3 to about 10, and x and y may be the same or different, and n is selected such that the formula has a molecular weight of at least about 1500. A specific example of such a polysiloxane material is PS-513, which is commercially available from Petrarch Systems Inc. This is a linear polydimethyl siloxane fluid which contains terminal aminopropyl groups. The material is a diprimary diamine having a molecular weight of about 28,000.

Suitable amine terminated reactive liquid polymers having hydrocarbon main chains are disclosed in U.S. Pat. No. 4,535,147, which is incorporated by reference. An example of such an amine terminated reactive liquid polymer is represented by the formula HYCAR ATBN 1300 x 16 and HYCAR ATBN 1300 x 21.

Stream (B) may further comprise hydroxyl-containing species such as one or a mixture of polyols which have an average molecular weight of at least 1500 and an average hydroxyl functionality from 2 to 8. The total of hydroxyl groups amount to less than 30 percent, equivalents basis, of the aliphatic imine groups in component B(ii), preferably less than 15 percent. Examples of suitable high molecular weight polyols include, for example, hydroxyl terminated polyoxpropylene; polyoxypropylene-polyoxyethylene copolymers; polyoxypropylene-polyoxybutylene copolymers; and polytetramethylene oxide diols. The amount, by weight, of these polyols should not exceed 50% of the weight of the imine-terminated polyether resin (B-ii), and preferably should be less than 25%, most preferably less than 10%, of the weight of B(ii).

Additives

The reaction systems of the present invention can further include additives such as internal mold release agents, catalysts, surfactants, blowing agents, fillers (which may be reinforcements), plasticizers, fire retardants, coupling agents, and the like.

Suitable internal mold release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mold release additive is Goldschmidt-412T (available from Goldschmidt Silicones). The amount of internal mold release agent used can be from about 0.001 to about 5.0 percent by weight of the total reactants (i.e. total polymer).

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines which include, for example, triethylamine heterocyclic amines such as N-alkylmorpholines which include, for example, N-methylmorpholine, N-ethylmorpholine; 2,2'-bis(-dimethylamino)diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of

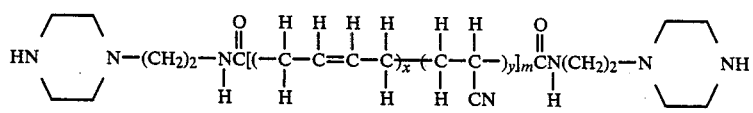

where x may be 1-10 and y may be 0-5, and m is selected such that the formula has a molecular weight of at least 1500. Such reactive liquid polymers are commercially available from B. F. Goodrich as carboxylic acids, may also be added to the formulations of the invention.

Another group of catalysts, which are more specific for the isocyanate-amine reaction, and particularly for the reaction of isocyanates with aliphatic imines, include carboxylic acids and precursors thereof (such as acid anhydrides). Specific examples of carboxylic acid catalysts include oleic acid, 1,12-dodecanedioic acid, isophthalic acid, and the like. These types of catalysts are described in U.S. Pat. Nos. 4,499,254; 4,487,908; and 4,487,912; and in U.S. Pat. No. 3,789,045 (for the imine-isocyanate rxn.)

It is often preferable to use a catalyst for the imine-isocyanate reaction in the polyurea formulations of this invention. The use of catalysts is, however, not essential. When catalysts are used, it is preferred to incorporate them into the isocyanate stream (A) and hence to isolate them from component B, until after the impingement mixing step. Suitable catalysts, or latent catalysts, which may be incorporated into the isocyanate stream include carboxylic acids. Particluarly preferred are fatty acids such as oleic acid. Organic carboxylic acid anhydrides are preferred as latent catalysts for use in the A-stream, for example, cis-1,2-cyclohexane-dicarboxylic acid anhydride (1).

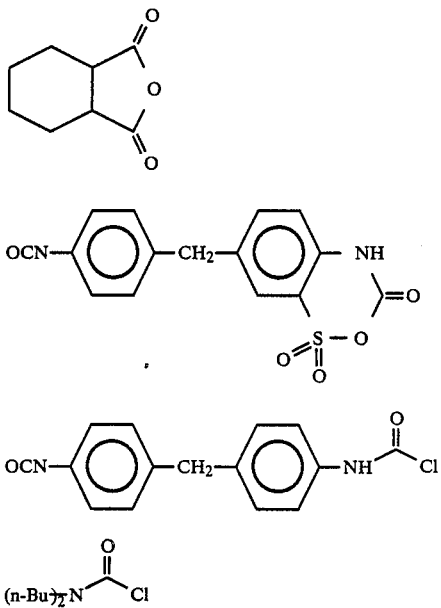

Other potential catalysts, or catalyst precursors, for use in the isocyanate include organic acid halides, such as butyryl chloride or benzoyl chloride; sulfonic acid anhydrides such as 2 (formed from the reaction of MDI with sulfur trioxide); Carbamoyl halides such as 3 (formed from reaction of MDI with hydrochloric acid), or 4. The catalysts, and/or catlayst precursors, should be used at concentrations of 5% (w/w) or less (relative to total polymer weight), preferably 2% or less, and most preferably less than 1%.

Catalysts may be useful as processing aids in some formulations.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gasses such as air, $CO_2$, $N_2O$, or nitrogen, and low boiling halogenated hydrocarbons such as methylene chloride and trichloromonofluoromethane. The amount of blowing agent used is less than about 4 percent by weight of the total reactants.

Suitable fillers include fiberglass reinforcement fibers, particularly those having lengths of from about 1/16 inch (0.16 cm) to about ½ inch (1.27 cm) and milled glass fibers having a length of 1/16 inch (0.16 cm), ⅛ inch (0.32 cm) or ¼ inch (0.64 cm) and the like. Shorter fibers are always preferred for ease of processing when they are incorporated as part of the "A" or "B" component streams. Other particularly suitable fillers are mica, fumed silica, flake glass, Wollastonite, calcium carbonate, carbon black, and the like.

Process

The reaction systems and polymers of this invention are mixing activated systems which are processed by the reaction molding (RIM) process in a RIM machine. The invention provides improved control (improved flow characteristics and improved mixing quality) in fast reacting, fast gelling systems. Accordingly, the invention is directed to reaction systems having gel times, under the conditions of processing, less than about 1 minute, preferably less than 30 seconds, more preferably less than 20 seconds, and most preferably les than 10 seconds. The reaction systems of this invention can be used to make polymers which are shapable by RIM into useful articles such as automobile fascia and panels.

RIM machines are well known in the art and include those supplied by Admiral Equipment Corp., Akron, Ohio by Cincinnati Milacron Corp., Cincinnati, Ohio, by Battenfeld Co., Mienerzhagen, West Germany and by Kraus Maffei GmbH, West Germany.

In the RIM process, the polyisocyanate composition is referred to as the "A" Component, and the "B" Component refers to the composition comprising the polyamine and imine-terminated reagents, components B(i) and B(ii), which component may optionally include other isocyanate-reactive material. The reagents may be blended in a suitable container and agitated at a temperature from about 20° C. to about 100° C. for a time between five and sixty minutes using a high sheer blade such as a Cowles blade, at a rotational speed of 50 to 2500 rpm. It is preferred to mix and process the ingredients of component (B) at or near ambient (20° C.) temperature. Ingredients B(i) and B(ii) should preferably not be heated (together) once mixed.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catlyst for the imine-isocyanate reaction. The temperature of the "B" Component can be between about 20° C. to about 80° C., but is preferably about 20° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.10. This ratio of equivalents is percentage. The expression "isocyanate-reactive-functional-groups" are defined herein known as the index and is often expressed as a to include imine groups, primary and/or secondary amine groups (aromataliphatic), hydroxyl groups, enamines groups ketene aminal groups, mercapto(—SH) groups and carboxylic acids, said groups being organically bound.

The "A" stream may contain up to 40% of its weight in solid fillers or reinforcements. In a preferred embodiment, the A stream contains at least 70% by weight of aromatic isocyanate species, not more than 30% by weight of fillers and/or reinforcements, and not more than 10% of other optional additives.

The impingement mixed blend of "A"/"B" streams is injected into a mold at a velocity from about 0.3 lb./sec. to about 70 lb./sec., preferably 5 to 20 lb./sec. The mold is heated to a temperature from about 20° C. to 250° C. Suitable molds are made of metal such as aluminum or steel, although other materials can be used if they can withstand the processing conditions and wear. Usually an external mold release agent is applied before the first molding. These are usually soaps or waxes which are solid at the mold temperature employed.

A molded polymer article is formed after the impingement mixture is in the mold from about 1 second to about 30 seconds, preferably 5 to 20 seconds. The mold is then opened and the molded product is removed from the mold. The molded product may be post cured by placing the product in an oven having a temperature between 50° C. and about 250° C. for a time from about one-half hour to about 3 hours.

Mold filling may be accomplished in this invention in a more facile manner due to the reaction profile of the systems disclosed herein. Generally there is an induction period of about 1 to 5 seconds, usually 1 to 3 seconds, during which the reaction between the isocyanate- and the imino-functional ingredients is flat or retarded. Following this induction period the reaction accelerates noticeably. This behavior is in sharp contrast to that of the primary aliphatic amines used in the prior art. These amines appear to begin reacting with aromatic isocyanates on contact. These reaction profiles can be visualized by means of the adiabatic temperature-rise technique, which involves dispensing reaction systems (or two or more individual ingredients) through an impingement mixing device into a insulated cup equipped with thermocouples. The temperature rise due to the reaction is then monitored, at intervals of 0.1 sec. or less, and plotted versus time. Of course, as expected, the induction periods are most clearly evident when the imino compounds are reacted neat (i.e., free of other ingredients) with the aromatic isocyanates. Further evidence of the improved flowability of the systems of the invention relative to the prior art are provided in the Examples. Molded objects can be de-molded after a mold residence time of 30 seconds, often 15 seconds or less at a mold temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.10; with the proviso that, if a catalyst for the conversion of isocyanate to isocyanurate groups is present, the index may extend up to about 15.00. Examples of suitable isocyanurate catalysts include alkali metal salts of carboxylic acids, for example, potassium 2-ethylhexoate.

In addition to polyurea RIM, the flow and property advantages and the resulting improvements in processability provided by the reaction systems of the invention make then well suited for use in mat reinforced structure/RIM systems (SRIM). In these systems, a continuous mat of reinforcing fibers is placed in the mold and the reaction system is pumped through and around this mat, thereby providing a composite with mechanical reinforcement. The flow requirmments for SRIM can therefore be quite demanding, however. The mats are generally made of glass fibers, but metallic fibers, aramid fibers, carbon fibers, Nylon fibers, combinations of these, and the like may be used. The individual fibers can be quite long relative to reinforcements which can be incorporated via individual component monomer streams, comparable to or longer than the molded part itself when fully extended. The polyurea systems of the invention are well suited to the demanding process requirements of SRIM.

The invention is further disclosed and described by means of the following examples which are not to be taken as limiting. In the Examples, flexural modulus ($E_{flex}$) was determined by ASTM D790. Shore D Hardness was determined by ASTM D2246. Heat Sag was determined by ASTM D3769-85. CLTE was determined by ASTM D696. Tensile strength was determined by ASTM D638. Impact falling weight (Impact) was determined by ASTM D3029-84.

The following glossary of materials is included to identify the reaction components in the Examples.

GLOSSARY

Pure MDI:
  Pure 4,4'-diphenylmethanediisocyanate having an average isocyanate equivalent weight of 125; commercially available from ICI Americas Inc. as Rubinate 44. This product contains less than 2% of the 2,4'-MDI isomer.

LF-168:
  Modified 4,4'-diphenylmethanediisocyanate having an average isocyanate equivalent weight of about 143; commercially available from ICI Americas Inc. as Rubinate LF-168

LF-209:
  A prepolymer based on a modified MDI and a high Mw polyether. The prepolymer has a free isocyanate (—NCO) content of 21.5 percent. Commercially available from ICI Americas Inc. as Rubinate LF-209

ISOCYANATE-24:

An 80:20 mixture of 4,4'-diphenylmethanediisocyanate and 2,4'-diphenylmethanediisocyanate. Available commercially from ICI Americas Inc.

XI-208:

A modified diphenylmethane diisocyanate variant, having an average isocyanate equivalent weight of about 135: available as development product XI 208 from ICI Americas Inc.

VM-20:

Modified pure MDI having an isocyanate content of 29.1% by weight: Commercially available from Imperial Chemical Industries PLC as Suprasec VM 20.

LHT-34

A polyoxypropylene triol (OH-number 34), commercially available from Union Carbide Corporation.

T-3275

A polyoxyethylene capped polyoxypropylene triol having a hydroxyl number of 32. Available commercially from Imperial Chemical Industries PLC as Daltocel T 32-75.

PPG 2000:

A polyoxypropylene diol having a hydroxyl number of 56. Available commercially from Imperial Chemical Industries PLC.

D-2000:

A 2000 molecular weight polyoxypropylene diamine, which is commercially available from Texaco Chemical Corporation under the registered trademark JEFFAMINE.

D 400:

A 400 molecular weight polyoxypropylene diamine commercially available as JEFFAMINE D-400 from Texaco Chemical Corporation.

E2103:

A polyoxyethylene capped polyoxpropylene diol of about 2000 molecular weight, commercially available from Texaco Chemical Corporation.

DETDA:

A mixture consisting of about 80% by weight 3,5-diethyl-2,4-diaminotoluene and 20% 3,5-diethyl-2,6-diaminotoluene, commercially available from Ethyl Corporation.

T-5000:

A polyoxypropylene triamine, commercially available from Texaco Chemical Corporation as JEFFAMINE T-5000. The molecular weight is 5000.

D-400 C.H.:

The cyclohexanone diimine of D-400.

T-5000 MEK:

The methyl ethyl ketone tri-imine of T-5000.

T-5000 Acetone:

The acetone tri-imine of T-5000.

Examples 1-9 are polyurea formulations according to the invention which were processed on an Admiral 2000 HP RIM Machine, a machine well known to those skilled in the art. The compositions of each side ("A" and "B") used to make the polyureas are shown in Table 1. Table 2 shows the processing parameters used to make each of the polyureas of Examples 1-9. Table 3 lists physical properties for the polyureas of Examples 1-9.

In each of Tables 1-3, C-1 denotes a control formulation not according to the invention. The amounts of components variously set forth for the "A" and "B" components in Tables 1-3 are in weight percent based on the total of reactive ingredients used to make the polymer, unless otherwise noted. Capital letters in parentheses, for example in Table 2, designate different molding conditions (such as mold temperature) for the same (identical) compositions.

TABLE 1

Polyurea Formulations; Admiral Machine:

| | Example | | | | | | | | | |
|---|---|---|---|---|---|---|---|---|---|---|
| | 1 | 2 | 3 | 4 | 5 | 6 | 7 | 8 | 9 | C-1 |
| Hardblock (%) | 45.00 | 45.00 | 45.00 | 45.00 | 45.00 | 45.00 | 45.00 | 45.00 | 45.00 | 45.00 |
| A-comp: | | | | | | | | | | |
| Pure MDI | — | 21.60 | 21.60 | — | — | 9.17 | 5.19 | 5.19 | — | — |
| LF-168 | — | 7.20 | 7.20 | — | — | 3.05 | 1.73 | 1.73 | — | — |
| LF-209 | — | — | — | — | — | — | — | — | — | — |
| Isocyanate-24 | 24.45 | — | — | 21.31 | 21.31 | 12.24 | 16.17 | 16.17 | 21.31 | 21.31 |
| XI-208 | 4.31 | — | — | 9.13 | 9.13 | 5.25 | 6.93 | 6.93 | 9.13 | 9.13 |
| LHT-34 | — | 46.08 | 46.08 | — | — | 19.56 | 11.08 | 11.08 | — | — |
| D-2000 | — | — | — | 24.91 | 24.91 | 14.31 | 18.90 | 18.90 | 24.91 | 24.91 |
| E-2103 | 9.59 | — | — | — | — | — | — | — | — | — |
| Oleic Acid+ | — | — | 1.00 | — | 1.00 | 1.00 | 1.00 | 1.00 | 1.00 | 1.00 |
| B-Comp: | | | | | | | | | | |
| DETDA | 16.22 | 16.17 | 16.17 | 14.56 | 14.56 | 15.29 | 15.00 | 15.00 | 14.56 | 14.56 |
| T-5000 MEK | 45.41 | 8.95 | 8.95 | 30.09 | 30.09 | 21.13 | 25.00 | — | — | — |
| T-5000 Acetone | — | — | — | — | — | — | — | 25.00 | 30.09 | — |
| T-5000 | — | — | — | — | — | — | — | — | — | 30.09 |

+Amounts are parts by weight (pbw) based on 100 pbw polymer

TABLE 2

Polyurea Systems; Processing Data

| | Example | | | | |
|---|---|---|---|---|---|
| | 1 | 2 | 3 | 4 | 5 |
| Hardblock (%) | 45.00 | 45.00 | 45.00 | 45.00 | 45.00 |
| Mold Temp (°C.) | 149 | 149 | 149 | 149 | 149 (A) |
| | | | | | 121 (B) |
| | | | | | 93 (C) |
| | | | | | 82 (D) |
| | | | | | 71 (E) |
| A-comp temp (°C.) | 55 | 40 | 40 | 45 | 45 |
| B-comp temp (°C.) | 30 | 30 | 30 | 21 | 25 |

TABLE 2-continued

Polyurea Systems; Processing Data

| | | | | | |
|---|---|---|---|---|---|
| +Mix pressures, psi | 2500 | 2500 | 2500 | 2500 | 2500 |
| Orifice A, mm | 4.5 | 4.5 | 4.5 | 4.5 | 4.5 |
| Orifice B, mm | 4.5 | 4.5 | 4.5 | 4.5 | 4.5 |
| Shot time (sec) | 0.33 | 0.34 | 0.34 | 0.32 | 0.32 |
| Total output (g/sec) | 999 | 999 | 999 | 999 | 999 |
| Demold Time (sec) | 30 | 30 | 30 | 30 | 30 |
| Postcure conditions (hours, °C.) | 1 h, 163 | 1 h, 163 | 1 h, 163 | 1 h, 163 | 1 h, 163 |
| Appearance at demold | Tough Opaque Soft | Tough Semi-Opaque | Tough Transparent | Opaque white tough | Opaque white tough at 82° or above++ brittle below |
| Appearance after Postucure | same | same | same | tough | tough |
| Flow Restrictors | 2 | 2 | 2 | 2 | 2 |

| | Example | | | | |
|---|---|---|---|---|---|
| | 6 | 7 | 8 | 9 | C-1 |
| Hardblock (%) | 45.00 | 45.00 | 45.00 | 45.00 | 45.00 |
| Mold temp (°C.) | 149 (A) 71 (B) 60 (C) | 149 | 149 (A) 60 (B) | 149 (A) 60 (B-D) | 149 (A) 121 (B) 93 (C) 82 (D) 71 (E) 60 (F-H) |
| A-comp temp (°C.) | 45 | 45 | 45 | 45 | 45 |
| B-comp temp (°C.) | 25 | 25 | 25 | 25 | 25 |
| +Mix pressures, psi | 2500 | 2500 | 2500 | 2500 | 2500 |
| Orifice A, mm | 4.5 | 4.5 | 4.5 | 4.5 | 4.5 |
| Orifice B, mm | 4.5 | 4.5 | 4.5 | 4.5 | 4.5 |
| Shot time (sec) | 0.32 | 0.33 | 0.33 | 0.32 (A, B) | 0.32 (A-F) 0.64 (G) 1.28 (H) |
| Total output (g/sec) | 999 | 999 | 999 | 999 (A, B) 500 (C) 250 (D) | 999 (A-F) 500 (G) 250 (H) |
| Demold Time (sec) | 30 (A, C) 15 (B) | 30 | 30 15 (B) | 30 (A, C, D) | 30 |
| Postcure conditions (hours, °C.) | 1 h, 163 | 1 h, 163 | 1 h, 163 | 1 h, 163 | 1 h, 163 |
| Appearance at demold | almost clear, Tough at 71° or above++ brittle at 60° | Tough++ Opaque | Tough at all temps++ clear | Tough; all conditions++ D - did not fill clear | clear tough at all mold temp++ H - did not fill |
| Appearance after Postucure | tough | tough | tough | tough | tough |
| Flow Restrictors | 2 | 2 | 2 | 2 | 2 |

+Both streams
++(Mold temp.) Showed no cracking when clamped (on demold) into vise, at or above the molding temperature indicated.

TABLE 3

Polyurea Properties

| | Example | | | | |
|---|---|---|---|---|---|
| | 2 | 3 | 4 | 5 (A) | 5 (D) |
| Hardblock (%): 45.00 | 45.00 | 45.00 | 45.00 | 45.00 | |
| Flex. Mod. (10³ psi) | | | | | |
| 73° F. | 37.3 ± 0.1 | 36.6 ± 0.3 | 76.0 ± 0.2 | 68.3 ± 0.8 | 71.8 ± 0.6 |
| −20° F. | 56.8 ± 6.0 | 61.0 ± 2.5 | 136.3 ± 2.8 | 122.1 ± 3.6 | 137.6 ± 0.9 |
| 185° F. | 31.0 ± 0.5 | 29.4 ± 0.1 | 55.9 ± 1.1 | 52.3 ± 0.6 | 54.2 ± 0.9 |
| Ratio (−20°/158°) | 1.83 ± 0.22 | 2.07 ± 0.09 | 2.44 ± 0.10 | 2.33 ± 0.10 | 2.54 ± 0.05 |
| Heat Sag (1 h, ±), in | | | | | |
| 250° F. | 0.04 ± 0.01 | 0.15 ∓ 0.02 | — | — | — |
| 275° F. | 0.04 ± 0.02 | 0.11 ± 0.05 | 0.07 ± 0.01 | 0.13 ± 0.05 | 0.13 ± 0.02 |
| 300° F. | 0.21 ± 0.02 | 0.15 ± 0.05 | — | — | — |
| 325° F. | 0.35 ± 0.07 | 0.40 ± 0.05 | 0.20 ± 0.00 | 0.23 ± 0.04 | 0.43 ± 0.00 |
| 350° F. | 0.66 ± 0.03 | 0.86 ± 0.03 | — | — | — |
| HDT, 66 psi, °C. | 182.5 ± 2.5 | 191.0 ± 1.0 | — | — | — |
| 264 psi, °C. | 61.0 ± 1.0 | 60.0 ± 2.0 | 56.5 ± 1.5 | 51.5 ± 0.5 | 48.5 ± 0.5 |
| Impact Resistance | | | | | |
| Gardner (73° F.); J | — | — | — | — | — |
| Gardner (−22° F.); J | — | 18+ | — | — | — |
| Ultimate Elongation (%) | 166 ± 22 | 182 ± 18 | 127 ± 20 | 117 ± 11 | 137 ± 7 |
| Tensile Strength (psi) | 4245 ± 388 | 4449 ± 295 | 4316 ± 237 | 4202 ± 211 | 4424 ± 115 |
| Tear Resistance (pli) | 459.6 ± 5.02 | 502.3 ± 5.93 | 344 ± 4.0 | 351 ± 6 | 347 ± 8 |
| S.P.G.: | 1.10 ± 0.01 | 1.10 ± 0.00 | 1.11 ± 0.00 | 1.11 ± 0.00 | 1.11 ± 0.00 |
| CLTE (in/in/°C.) × 10⁻⁵ | — | — | — | — | — |

TABLE 3-continued

| Polyurea Properties | | | | | |
|---|---|---|---|---|---|
| Mold Temp. (°C.) | 149 | 149 | 149 | 149 | 82 |

| | Example | | | | |
|---|---|---|---|---|---|
| | 6 | 7 | 8 | 9 | C-1 |
| Hardblock (%): | 45.00 | 45.00 | 45.00 | 45.00 | 45.00 |
| Flex. Mod. ($10^3$ psi) | | | | | |
| 73° F. | 48.6 ± 0.8 | 46.9 ± 1.4 | 60.6 ± 1.3 | 71.5 ± 0.3 | 53.6 ± 0.4 |
| −20° F. | 83.1 ± 3.4 | 92.8 ± 1.4 | 110.5 ± .1 | 131.5 ± 0.8 | 111.0 ± 1.8 |
| 158° F. | 33.4 ± 0.4 | 37.6 ± 1.2 | 47.2 ± 0.8 | 54.3 ± 2.4 | 41.7 ± 0.7 |
| Ratio (−20°/158°) | 2.49 ± 0.13 | 2.47 | 2.34 | 2.42 | 2.66 |
| Heat Sag (1 h, 6″), in | | | | | |
| 250° F. | — | — | — | — | — |
| 275° F. | 0.20 ± 0.01 | 0.17 ± 0.04 | 0.13 ± 0.01 | 0.03 ± 0.02 | 0.17 ± 0.02 |
| 300° F. | — | — | — | — | — |
| 325° F. | 0.37 ± 0.05 | 0.72 ± 0.02 | 0.44 ± 0.02 | 0.42 ± 0.01 | 0.48 ± 0.04 |
| 350° F. | — | — | — | — | — |
| HDT, 66 psi, °C. | — | — | — | — | — |
| 264 psi, °C. | 44.5 ± 0.5 | 52.0 ± 2 | 56.0 ± 0 | 57.5 ± 0.5 | 48.5 ± 3.5 |
| Impact Resistance | | | | | |
| Gardner (73° F.); J | — | — | — | — | — |
| Gardner (−22° F.), J | — | — | 18.1+ | 18.1+ | 18+ |
| Ultimate Elongation (%) | 143 ± 25 | 69 ± 25 | 101 ± 5 | 103 ± 5 | 159 ± 0 |
| Tensile Strength (psi) | 3985 ± 347 | 3174 ± 295 | 3721 ± 29 | 4045 ± 147 | 4219 ± 106 |
| Tear Resistance (pli) | 428 ± 5 | 329 ± 9 | 429 ± 17 | 405 ± 6 | 498 ± 6 |
| S.P.G.: | 1.11 ± 0.00 | 1.11 ± 0.01 | 1.10 ± 0.00 | 1.11 ± 0.00 | 1.12 ± 0.01 |
| CLTE (in/in/°C.) × $10^{-5}$ | — | — | — | — | — |
| Mold Temp. (°C.) | 149 | 149 | 60 | 60 | 60 and 149 |

+Above upper limit of test, (4 lb. weight).

Formulation C-1 is not of this invention. Example C-1 is of the prior art. This conventional polyurea formulation was included because it is exactly analogous to the formulation of Example 9; differing only in that underivatized T-5000 was used (instead of the acetone imine, as in Example 9).

The processing of formulations 9 and C-1 were carefully scrutinized (see Table 2; conditions A-D, and A-H, respectively). This was done by reducing machine output and increasing shot-time; until the mold could no longer be filled. Under the conditions of this experiment, formulation 9 (according to the invention) exhibited better flow/fill characteristics than formulation C-1 (the analogous system of the prior art). At the lowest machine output investigated in these experiments (conditions "D" for Example 9, and conditions "H" for formulation C-1;—ie. 250 g/sec. at 60° C. mold temp.), neither system filled the mold. However, formulation 9 penetrated more than twice as far into the mold than did formulation C-1 (ie. under the same processing conditions), before gelation prevented further flow. Moreover, the partially filled part from system 9 (D) appeared well mixed and had a smooth flow-front whereas the analogous "short shot" from system C-1 (H) was very poorly mixed (ie. contained mix-lines, many color-inhomogeneities, and turbulence patterns), and exhibited a ragged flow front. These observations are diagnostic of poor flow characteristics for system C-1 (H).

EXAMPLE 10-11 AND CONTROL FORMULATIONS C-2,C-3

These examples are intended to further demonstrate the superior processability of compositions according to the invention.

The compositions of Examples 10-11 and of control formulations C-2 and C-3 were molded into a complex automobile front fascia, including grillwork, in a RRIM 90 molding machine (available commercially from Cincinnati Milacron, Cincinnati, Ohio). Compositional data and molding conditions are set forth in Table 4, following:

TABLE 4

| | Example | | | |
|---|---|---|---|---|
| | C-2 | C-3 | 10 | 11 |
| Hardblock (%) | 45 | 45 | 45 | 45 |
| A-Comp: | | | | |
| Isocyanate-24 | 21.31 | 21.31 | 21.31 | 21.31 |
| XI-208 | 9.13 | 9.13 | 9.13 | 9.13 |
| D-2000 | 24.91 | 24.91 | 24.91 | 24.91 |
| Oleic Acid | 1.00 | 1.00 | 1.00 | 1.00 |
| B-Comp: | | | | |
| DETDA | 14.56 | 14.56 | 14.56 | 14.56 |
| T-5000 | 30.09 | 30.09 | | |
| T-5000 Acetone | | | 30.09 | 30.09 |
| Mold Temp (°C.) | 65.5 | 65.5 | 65.5 | 65.5 |
| A-Comp Temp (°C.) | 36 | 36 | 36 | 36 |
| B-Comp Temp (°C.) | 36 | 36 | 36 | 36 |
| Demold Time (S) | 30 | 30 | 30 | 30 |
| Inj. Rate (lb/sec.) | 8 | 7 | 7 | 6 |
| Green Strength | Good | Good | Good | Good |
| % of Fill* | 100 | 95 | 100 | 98 |

*Approximate. The part required 13.9 pounds, the shot weight used, to fill its 0.192 cubic foot volume.

Control formulations C-2 and C-3, which contained the amine-terminated polypropylene oxide triamine T-5000 but contained no imine-terminated aliphatic polyether, unacceptably formed V-shaped notches or voids in the grillwork. Examples 10 and 11, which contained the imine-terminated species corresponding to the amine-terminated polypropylene oxide triamine of C-2 and C-3, formed no such voids or notches. This is indicative of superior processability of compositions according to the invention. Also, Examples 10-11 filled the mold completely or more completely at lower injection rates than C-2 or C-3, further indicating the better processability of compositions according to the invention.

EXAMPLE 12

This example illustrates the laboratory preparation of an imine-terminated polyether.

4000 g of T-5000 and 4000 g of methyl ethyl ketone were added to a 3-neck 10 liter round bottom glass reaction kettle. A condenser column was placed atop the reaction kettle on one neck, a gentle dry nitrogen flow was maintained at the top of the condenser, while through a second neck the kettle was equipped with a thermometer. Agitation of the reaction mixture with a glass stir shaft and a stir paddle made from polytetrafluoroethylene (TEFLON®, DuPont) was implemented through the third neck and heat was applied with a heating mantle until reflux, about 80° C. Reflux was continued for one hour.

The temperature was decreased until reflux stopped, and agitation was discontinued. The reflux column was replaced with a distillation column and nitrogen flow was implemented into the reaction vessel and out through the distillation column. Agitation was restarted and sufficient heat was applied to maintain a steady distillation rate of residual methyl ethyl ketone. When distillation was complete the reaction kettle was equipped with vacuum by attaching the vacuum source (i.e. a pump) to the distillation receiver flask. The apparatus was sealed by using silicone grease to lubricate joints. Vacuum was begun gradually with gentle stirring at 80° C., the vacuum pressure being ultimately decreased to less than 1.5 torr for one hour.

The vacuum was then broken and the reaction tested for completion by infrared (IR) spectroscopy of the product. The absence of a carbonyl peak at 1710 cm$^{-1}$, indicated that residual methyl ethyl ketone had been completely removed. The absence of an amine peak at 1600–1610 cm$^{-1}$ indicated that T-5000 had reacted completely. The presence of an imine peak at 1660 cm$^{-1}$ indicated the formation of the desired T-5000 MEK. The intensity of a reference peak at 1490 cm$^{-1}$, present in both reactant and product spectrums, was used to guage the pressure which was applied to the salt cells to achieve roughly the same thickness of each sample monitored.

EXAMPLE 13

This example illustrates the laboratory preparation of an imine-terminated polyether using a cosolvent distillation.

4500 g of T-5000, 2250 g of acetone, and 2250 g of toluene was placed in a 10 liter reaction kettle and heated with dry nitrogen flow and agitation to reflux, about 70° C., and refluxed for one hour, as described in Example 12. The reflux condenser was then replaced with a distillation column and the mixture was heated to 80° C. maximum to maintain a steady distillation rate of residual acetone and toluene. The system was then sealed and evacuated gently, ultimately reaching a vacuum of less than 1.5 torr. The temperature was gradually increased during this distillation to 130° C. to distill toluene. After one hour at 1.5 torr or less, vacuum was broken and the product was tested for completeness of reaction. The reaction was determined to be complete by IR, using the same peaks noted in Example 12, including the carbonyl peak at 1710cm$^{-1}$ which can be used to monitor the absence of acetone as well as methyl ethyl ketone.

EXAMPLE 14

This example illustrates the synthesis of an imine-terminated polyether in produciion quantities.

210 lb. of T-5000was preheated to 35°–40° C. and added to a 60 gallon reaction kettle along with 70 lb. of toluene and 70 lb. of acetone. The kettle was purged with dry nitrogen prior to adding the T-5000, toluene and acetone therein. The kettle was pre-equipped with a metal coil through which hot water or steam for warming the reaction mixture or cold water for cooling the reaction could be circulated. A dry nitrogen sparge was implemented through the reaction mixture.

Steam was circulated through the metal coil until a reaction temperature of about 65° C. was reached. At this point, external heat through a heating mantle was applied until reflux was reached, taking care to avoid foaming the mixture. Reflux was maintained for 2 hours from the start of boil up.

The reflux line was closed and distillation was effected by increasing the temperature to 125° C. About 95 lb. of water/acetone/toluene distilled over before the 125° C. set point was reached. At this point, the heat was turned off and cold water was circulated through the metal coil to cool the reaction mixture to about 75° C.

An initial vacuum stage for stripping was applied until about 25 inches of mercury vacuum was achieved. Vacuum was then lowered to about 100 mm of mercury while heating the kettle mixture to about 125° C. At this point the heat was turned off and cooling water was circulated through the metal coil to achieve a temperature of about 75° C.

The condensate receiver was drained and final vacuum stripping was initiated by implementing a vacuum of about 25 mm of mercury while reheating to about 150° C. and holding for one hour. Heat, vacuum, and nitrogen sparge were then turned off and the final T-5000 acetone product was cooled to below 35° C.

Examples 15 and 16 are comparative examples which, together with example 17, illustrate the use of low molecular weight (ca. less than M.W.=1500) imino-functional polyether resins as chain extenders.

EXAMPLE 15

A prepolymer was made by sequentially adding 25.9 parts by weight of T-3275 and 24.9 parts by weight of D-2000 to 49.2 parts by weight of ISOCYANATE-24. The prepolymer, which had an isocyanate content of 13.53 wt. %, was employed as the "A" component and reacted with a "B" component having the following composition:

catalyst and internal mold release agent—2.5 pbw
D-400—50 pbw
DETDA—50 pbw

The formulation was processed on a Battenfeld SHK 65 RIM machine wherein the "A" component was maintained at 40° C. and the "B" component was maintained at 40° C. before being impingement mixed and injected into a mold which had been preheated to 65° C. The hardblock content of the processed formulation was 62.4 wt. %.

EXAMPLE 16

The same formulation was processed as in Example 15, except that the prepolymer "A" component was formulated additionally to contain 10 parts by weight of VM 20. The prepolymer was thus formulated by reacting the following (in pbw).
T-3275—25.9
D-2000—24.9
ISOCYANATE-24—49.2
VM-20—10

The isocyanate content of the prepolymer was 14.95 wt. %. The hardblock content of the processed formulation (i.e. the finished polymer) was 67.7%.

EXAMPLE 17

The same formulation was processed as in Example 16, except that D-400 in the "B" component was replaced with an equal amount of D-400 C.H. The "B" component thus contained (pbw)
catalyst and internal mold release agent—2.5
D-400 C.H.—50
DETDA—50

The hardblock content of the processed formulation was 67.7%.

It was noted that the formulation of Example 17 which employed an imino-functional chain extender and which is within the scope of this invention, gave much better flow than the formulations of Examples 15 and 16 which employed the corresponding aliphatic amine and are not within the invention. More specifically, the gel time was well less than one second for the formulations of Examples 15 and 16 but was 1.6 seconds for Example 17. This demonstrates superior flow provided by using an imino-functional chain extender.

Table 5 gives the physical properties for test plaques molded from the formulations of Examples 15-17. The test plaques were one foot squares having a thickness of 3 mm.

TABLE 5

|  | Example | | |
|---|---|---|---|
|  | 15 | 16 | 17 |
| $E_{flex}$ (MPa) | 532 | 800 | 912 |
| Density (Kg/M$^3$) | 1072 | 1110 | 1101 |
| Shore D Hardness | 66 | 69 | 75 |
| Tensile Str. (KPa) | 29407 | 27850 | 29072 |
| Elongation (%) | 130 | 60 | 17 |
| Heat Sag (160° C.) | | | |
| 30" | 11.5 | 4.5 | 6.5 |
| 60" | 20.5 | 9.0 | 14.5 |
| CLTE* ($\alpha \cdot 10^6$/°C.) | 130 | 126 | 135 |
| Impact (joules) | | | |
| Room Temp. | 50 | 38 | 39 |
| −20° C. | 41 | 15 | 21 |

*CLTE = Coefficient of Linear Thermal Expansion

EXAMPLE 18

This example illustrates the synthesis of an imino-functional softblock resin wherein the imino functionalities are guanidine groups.

7500 g of T-5000 (1.5 moles) and 770.6g of N,N'-dicyclohexylcarbodiimide (hereinafter DCC) (3.74 moles) were charged to a ten liter reactor along with, as catalyst, 7.5g of Cu(I)Cl. The reactor had been fitted with a mechanical stirrer, nitrogen sparge, and a temperature control thermocouple. The temperature was set to 130° C. The progress of the reaction was monitored by IR analysis by means of the reduction of a peak at 2130 cm$^{-1}$ which indicated the consumption of DCC and the growth of a peak at 1640 cm$^{-1}$ which indicated formation of the guanidine end groups. An IR spectrum taken after 1120 minutes showed that reaction was essentially complete so the product was cooled and discharged.

EXAMPLE 19

This example illustrates the synthesis of an imino-functional softblock wherein the imino-functionalities are isourea groups.

5000 g of PPG 2000 (2.5 moles), 1289.0 g of DCC (6.25 moles) and 12.5 g of Cu(I)Cl as catalyst were charged to a ten liter reactor which had been fitted with a mechanical stirrer, nitrogen sparge, and temperature control thermocouple. The temperature was set to 130° C. The progress of the reaction was monitored by IR analysis by means of the reduction of a broad OH band at 3500 CM$^{-1}$ which indicated the comsumption of PPG 2000, the reduction of a peak at 2130 cm$^{-1}$ which indicated the consumption of DCC, and the growth of a peak at 1660 cm$^{-1}$ which indicated formation of isourea end groups. An IR spectrum taken after 110 minutes indicated that the reaction had started. After 1210 minutes another gram of catalyst was added since an IR spectrum indicated that the rate of reaction had slowed greatly. After 1475 minute an IR spectrum showed no further reduction in the OH peak so the reaction was considered complete and the heat was turned off after 1490 minutes.

EXAMPLE 20

This example illustrates the synthesis of a polyurea from isourea-functional reactants.

An isocyanate-terminated prepolymer was formed by sequentially adding 26.54 pbw of T-3275 and 25.38 pbw of D-2000 to 49.94 pbw of ISOCYANATE-24. This prepolymer was impingement mixed with the following "control" and "Example 20" "B" components wherein "isourea" refers to the isourea softblock generated as in Example 19.

| Control | Example 20 |
|---|---|
| PPG 2000 - 60 pbw | Isourea - 60 pbw |
| DETDA - 40 pbw | DETDA - 40 pbw |

The weight ratio of the "A" component to the "B" component was 1.64. The isocyanate index was 105. The components were maintained at a temperature of 40° C. before being impingement mixed at a pressure of 200 bar and injected into a mold preheated to 100° C. The following table gives the physical properties of test plaques molded from the control and Example 20 formulations. Units are the same as in Table 5.

|  | Control | Isourea |
|---|---|---|
| $E_{flex}$ | 423 | 579 |
| Shore D hardness | 60 | 66 |
| Density | 1075 | 1089 |
| Heat Sag | | |
| 30" | 1 | 0 |
| 60" | 1 | 6.5 |
| CLTE | 121 | 122 |

EXAMPLE 21

A prepolymer was mde by adding 49.1 parts by weight of D-2000 to 50.9 parts by weight of LF-209. The prepolymer, which had an isocyanate content of 14.50 wt. % was employed as the "A" component and reacted with "B" component having the following composition:

catalyst and internal mold release agent—2.5 pbw
D-400—50 pbw
DETDA—50 pbw

The formulation was processed on a Battenfeld SHK 65 RIM machine wherein the "A" component was maintained at 40° C. and the "B" component was maintained at 40° C. before being impingement mixed and injected into a mold which had been preheated to 65° C. The hardblock content of the processed formulation was 65 wt. %.

EXAMPLE 22

The same formulation was processed as in Example 15, except that D-400 in the "B" component was replaced with an equal amount of D-400 C.H. The weight ratio of "A" to "B" components was also adjusted to take into account the difference in equivalent weight of D-400 to D-400 C.H. The "B" component thus contained (pbw)

catalyst and internal mold release ggent—2.5 pbw
D-400 CH.—50 pbw
DETDA—50 pbw

The hardblock content of the processed formulation was 66 wt. %.

It was noted that the formulation of Example 16 which employed an imino-functional chain extender and which is within the scope of this invention, gave much better flow than the formulation of Example 15 which employed the corresponding aliphatic amine and is not within the invention. More specifically, the gel time was well less than one second for the formulation of Example 15 but was ca. 1.6 seconds for Example 16. The mold residence time was twenty seconds for both formulations. This demonstrates superior flow without loss of system cycle time by using an imino-functional chain extender.

Table 6 gives the physical properties for test plaques molded from the formulations of Examples 21 and 22. The test plaques were one foot squares having a thickness of 3 mm.

TABLE 6

| | Example | |
|---|---|---|
| | 21 | 22 |
| $E_{flex}$ (MPa) | 1,046 | 980 |
| Density (Kg/M$^3$) | 1,080 | 1,050 |
| Shore D Hardness | 69 | 69 |
| Tensile Str. (KPa) | 17,850 | 30,800 |
| Elongation (%) | 10 | 111 |
| CLTE* ($\alpha \cdot 10^6$/°C.) | 140 | 134 |
| Impact (joules) | | |
| Room Temp. | 5.02 | 9.00 |
| −20° C. | 2.51 | 3.05 |

EXAMPLE 23

This example illustrates the synthesis of a polyurea from guanidine-functional reactants.

An isocyanate-terminated prepolymer was formed by sequentially adding 26.54 pbw of T-3275 and 25.38 pbw of D-2000 to 49.94 pbw of ISOCYANATE-24. This prepolymer was impingement mixed with the following "B" component wherein "guanidine" refers to the guanidine softblock generated as in Example 18.

Example 23
Guanidine—60 pbw
DETDA—40 pbw

The weight ratio of the "A" component to the "B" component was 1.58. The isocyanate index was 105. The components were maintained at a temperature of 40° C. before being impingement mixed at a pressure of 200 bar and injected into a mold preheated to 100° C. The following table gives the physical properties of test plaques molded from the Example 23 formulations. Units are the same as in Table 5.

| $E_{flex}$ | 592 |
|---|---|
| Shore D hardness | 63 |
| Density | 1098 |
| Heat Sag | |
| 30" | 19 |
| CLTE | 126 |

What is claimed is:

1. A reaction system for use in making a polymer by a reaction injection molding process, said system comprising the following reaction components:
   (A) an organic aromatic polyisocyanate; and
   (B) an isocyanate-reactive composition comprising at least one imino-functional compound which has at least one imino group that is directly reactive towards isocyanates and which conforms to the following structure

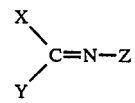

wherein
X, Y, and Z are chemical moieties which collectively form the rest of said compound and are each independently selected from the group consisting of H and organic radicals which are attached to the imino unit

of said compound through N, C, O, S, Si or P;
the central carbon atom of said imino unit is bonded to three atoms; and
said system is used to make a polymer by impingement mixing a stream comprising said reaction component (A) and a stream comprising said reaction component (B).

2. A reaction system as defined in claim 1, wherein any two of the substituents X, Y and Z are incorporated as members of a non-aromatic 5 or 6 membered ring.

3. A reaction system used to make polymers by a reaction injection molding process, comprising
   A. an aromatic polyisocyanate which has a number averaged isocyanate functionality of from about 1.8 to about 4.0 and a number-averaged molecular weight of from about 120 to about 1800, wherein more than 50 mole percent of the reactive isocyanate (—NCO) groups of said polyisocyanate are bonded directly to aromatic rings and at least 50 mole percent of the species comprising said polyisocyanate are diisocyanates; and
   B. an isocyanate-reactive compositon comprising
      (i) a chain extender comprising a. 0–100% of an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and, correspondingly, b. 100–0% of an imino-functional aliphatic compound having a number-averaged molecular weight less than 1500 and a number-averaged functionality of isocyanate-reactive imino units of about 1 to about 3, and (ii) an imino-functional polyether resin having an average of from about 1.1 to about 5 isocyanate-reactive imino groups per molecule and a number-averaged molecular weight of from 1500 to about 10,000, wherein said imino groups constitute at least 50 mole percent of the isocyanate-reactive groups in said polyether resin, and at least 50 mole percent of said imino-functional polyether species contain two or more imino (C=N) groups per molecule;

wherein said system is used to make a polymer by impingement mixing a stream comprising said reaction component (A) and a stream comprising said reaction oomponent (B).

4. A reaction system as defined in claim 3, wherein said lower molecular weight imino-functional component (B)(i)(b) has a number averaged molecular weight less than about 600, a number averaged functionality of imino groups between about 1.2 and about 2.5, and consists of aliphatic species.

5. A reaction system as defined in claim 4, wherein said lower molecular weight imino-functional species are imino-functional polyether resins.

6. A reaction system as defined in claim 3, wherein said imino groups are simple imines.

7. A reaction system as defined in claim 6, wherein said imines are aliphatic imines, neither of the atoms of the C=N unit are incorporated within or bonded directly to an aromatic ring, and the carbon atom of the C=N unit is bonded to at least one other carbon atom bearing one or more hydrogen atoms.

8. A reaction system as defined in claim 3, wherein the imino groups of said imino-functional aliphatic compound and said imino-functional polyether resin are selected from among the following specific types:

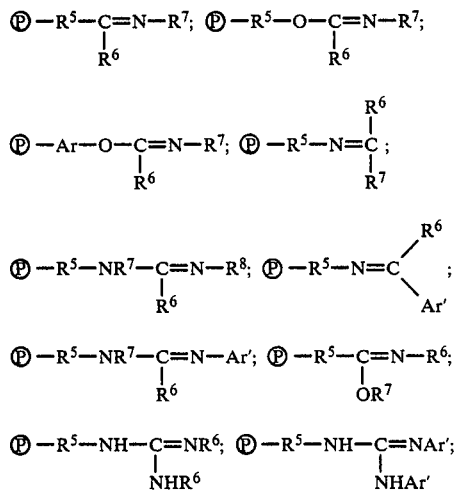
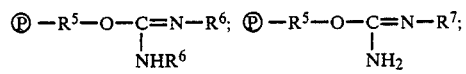
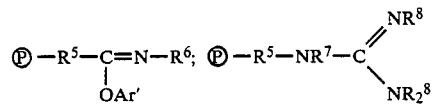

wherein:
$R^5$ and Ar are divalent aliphatic and aromatic organic linking groups, respectively;

Ⓟ represents a polyether or hydrocarbon chain or radical, to which said imino (C=N) functional group is attached;

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

9. A reaction system as defined in claim 3, wherein either of streams (A) and/or (B) further comprises between 0.001 and 10% by weight of one or more additives selected from the group consisting of urethane catalysts, urea catalysts, carboxylic acids, sulfonic acids, mineral acids, internal mold release agents, fire retardants, plasticizers, tertiary amines, surfactants, coupling agents, isocyanurate catalysts, carboxylate metal salts, antioxidants, and pigments.

10. A reaction system as defined in claim 3, wherein either stream (A) and/or (B) further comprises a solid filler or reinforcement.

11. A reaction system as defined in claim 3, wherein said stream (A) further comprises between 0.01 and about 10% of an acid or acid precursor selected from the group consisting of carboxylic acids, carboxylic acid anhydrides, sulfonic acids, sulfonic acid anhydrides, carbonic acid anhydrides, carboxylic acid halides, sulfonic acid halides, carbonic acid halides, mixed acid anhydrides, and mixtues thereof.

12. A reaction system as defined in claim 3, wherein component B(i)(a) is an aromatic polyamine substantially free of elements other than C, N, and H and which contains at least one alkyl group of 1–4 carbon atoms ortho to each primary aromatic amine group.

13. A reaction system as defined in claim 2, wherein component B(ii) is an aliphatic, iminofunctional, liquid resin based predominantly upon polyoxypropylene and has a molecular weight in the range of from about 2000 to about 8000 and a number averaged functionality of imino units from about 2 to about 5.

14. A reaction system as defined in claim 3, wherein said aromatic polyisocyanate is selected from polyphenylmethane polyisocyanate (crude MDI), 4,4'-diphenylmethane diisocyanate, 2,4'-diphenylmethane diisocyanate, derivatives thereof, and mixtures thereof.

15. A polymer prepared from a reaction system as defined in claim 3.

16. An article molded from a polymer as defined in claim 15.

17. A molded article as defined in claim 16, wherein said article is prepared by molding over or encapsulating a mat, screen, or other contiguous reinforcing structure.

18. A molded article as defined in claim 16, which is fully solid and capable of being demolded and handled, without damage, within 30 seconds of the time in which said streams (A) and (B) are combined by impingement mixing.

19. A molded article as defined in claim 18 which is formed in a closed mold, said mold being at a temperature less than 350° F. and said components (A) and (B) being, individually, at a temperature less than 250° F.

20. A molded article as defined in claim 19, wherein said mold is at a temperature less than 180° F. and said components (A) and (B) are, individually, at a temperature less than 150° F.

21. A reaction system as defined in claim 3, wherein a blowing agent is incorporated into component (A) and/or (B).

22. A reaction system as defined in claim 3, wherein the ratio of isocyanate equivalents in stream (A) to the total equivalents of isocyanate reactive groups, including imino ( C=N ) groups, in stream (B) is between 0.8 and 1.90: with the proviso that, if a catalyst for the isocyanurate reaction is present, said ratio may extend up to 15.

23. A reaction system for use in making a polymer by a reaction injection molding process, said system comprising the following reaction components:
A. an aromatic polyisocyanate which has a number averaged isocyanate functionality of from about 1.8 to about 4.0 and a number-averaged molecular weight of at least about 120, wherein more than 50 mole percent of the reactive isocyanate (—NCO) groups of said polyisocyanate are bonded directly to aromatic rings and at least 50 mole percent of the species comprising said polyisocyanate are diisocyanates; and
B. an isocyanate-reactive composition comprising
(i) a chain extender comprising an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines, and
(ii) an imino-functional chain extender having a molecular weight less than about 600 and a number-averaged functionality of imino units between about 1 and about 2.5, said imino groups being capable of reacting directly with isocyanates,
wherein the ratio by weight of component B(i) to B(ii) being between about 1:9 and about 9:1.

24. A reaction system as defined in claim 23, wherein said imino-functional chain extender comprises a simple aliphatic imine wherein
the carbon atom of each imino unit (>C=N—) is bonded only to saturated aliphatic carbon atoms or hydrogen, and
said saturated aliphatic carbon atoms are each themselves bonded only to saturated aliphatic carbon atoms and/or hydrogen.

25. A reaction system as defined in claim 24, wherein said imino-functional chain extenders are simple imine derivatives made by reacting aliphatic mono and/or polyamines with at least one member selected from the group consisting of acetone, cyclehexanone, isobutyraldehyde, acetaldehyde, o-hydroxybenzaldehyde, cyclopentanone, 1-propanal, and 1-butanal.

26. A polymer formed by a reaction injection molding process wherein at least two liquid streams (A) and (B) are impingement mixed under moisture free conditions, said streams comprising, respectively, the following reactants:
(A) an organic polyisocyanate having a number-averaged functionality of from about 1.8 to about 4.0 and a number-averaged molecular weight of from about 120 to about 1800,
wherein more than 50 mole percent of the reactive isocyanate (—NCO) groups of said polyisocyanate are bonded directly to aromatic rings and at least 50 mole percent of the species comprising said polyisocyanate are diisocyanates; and
(B) a mixture comprising the following isocyanate-reactive components
(i) an aromatic polyamine having a number-averaged functionality of aromatically bound primary and/or secondary amine groups of from about 1.8 to about 3.0, a number-averaged molecular weight of from about 100 to about 400, and wherein at least 50 mole percent of the species comprising said polyamine are diamines: and
(ii) an imine-terminated aliphatic polyether having an average of from about 1.1 to about 4 imine

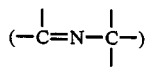

groups per molecule and a number-averaged molecular weight of from about 1500 to about 10,000,
wherein said imine groups constitute at least 50 mole percent of isocyanate-reactive functional groups in said polyether and at least 50 mole percent of the imine-terminated species comprising said mixture are di-imines and/or tri-imines, the weight ratio of said reactant B(i) to said reactant B(ii) being in the range of about 9:1 to about 1:9,
and wherein the relative amounts of said stream (A) and said stream (B) are such that said process is conducted at an isocyanate index between 0.70 and 1.50.

27. A polymer, as defined in claim 26, which is elastomeric.

28. A polymer as defined in claim 26, which is formed into a molded article by injection into a closed mold upon impingement mixing of streams A and B, and which may be demolded, without breakage, after a mold residence time of less than 30 seconds at a mold temperature less than 350° F.

29. A polymer as defined in claim 26, wherein at least 90 mole percent of the reactive isocyanate groups of said polyisocyanate are bonded directly to aromatic rings.

30. A polymer as defined in claim 26, wherein said polyisocyanate has a number-averaged functionality between 1.9 and 2.3.

31. A polymer as defined in claim 26, wherein said polyisocyanate has a number-averaged molecular weight between about 170 and about 800.

32. A polymer as defined in claim 26, wherein at least 70 mole percent of the species comprising said polyisocyanate are diisocyanates.

33. A polymer as defined in claim 26, wherein at least 55 weight percent of said stream (B) is constituted by said mixture of component (i) and component (ii).

34. A polymer as defined in claim 26, wherein the weight ratio of component (B)(i) to component (B)(ii) is between 1:5 and 3:1.

35. A polymer as defined in claim 26, wherein said aromatic polyamine has a number-averaged functionality between 1.9 and 2.2.

36. A polymer as defined in claim 26, wherein said aromatic polyamine has a molecular number averaged weight between 122 and 300.

37. A polymer as defined in claim 26, wherein at least 95 mole percent of the amine groups in said polyamine are aromatically bound.

38. A polymer as defined in claim 26, wherein at least 95% of the species comprising said polyamine contain two aromatically bound primary and/or secondary amine groups.

39. A polymer as defined in claim 26, wherein at least 85 mole percent of the aromatic amine groups within said polyamine composition are primary amines 40. A polymer as defined in claim 26, wherein said aliphatic polyether contains an average of 1.6 to about 3 imine groups per molecule.

41. A polymer as defined in claim 26, wherein all atoms bonded directly to said polyether reactant at an imine nitrogen or imine carbon atom are fully saturated carbon atoms.

42. A polymer as defined in claim 26, wherein said imine-terminated polyether has an number-averaged molecular weight between 2000 and 8000 and is substantially free of imine-containing polyethers having a molecular weight less than 1500.

43. A polymer as defined in claim 26, wherein imine groups comprise at least 70 mole percent of isocyanate-reactive functional groups present in said imine-terminated polyether.

44. A polymer as defined in claim 26, wherein at least 70 mole percent of said aliphatic imine terminated polyether consists of di-imines and/or tri-imines.

45. A polymer as defined in claim 26, wherein the ratio of isocyanate equivalents in said stream (A) to the total equivalents of isocyanate-reactive functional groups present in said stream (B) is between 0.9 and 1.2.

46. A polymer as defined in claim 26, wherein the weight ratio of said stream (A) to said stream (B) is between 1:3 and 3:1.

47. A polymer as defined in claim 26, wherein said stream (B) further comprises, relative to the combined total weight of components (B)(i) and (B)(ii), between 0.1 and 40% (w/w) of imine-containing aliphatic species having a molecular weight less than 1500.

48. A polymer as defined in claim 47, wherein said imine-containing aliphatic species has a number averaged molecular weight less than 500 and a number averaged aliphatic imine group functionality between 1.5 and about 2.5.

49. A polymer as defined in claim 26, wherein said stream (B) further comprises between 0.1 and 40% (w/w), relative to the combined total weight of (B)(i) and (B)(ii), an aliphatic amine having a molecular weight less than about 1500 and a number-averaged functionality of primary and/or secondary amine groups between about 1 and about 3.

50. A polymer as defined in claim 26 wherein said stream B further comprises a minor amount, between 0.1 and 40% by weight relative to the total combined weight of components (B)(i) and (B)(ii), of organic hydroxyl-containing species.

51. A polymer as defined in claim 26, wherein said stream B further comprises between 0.001 and 10% by weight of one or more additives selected from urethane catalysts, carboxylic acids, sulfonic acids, mineral acids, internal mold release agents, plasticizers, surfactants, fire retardants, and coupling agents.

52. A polymer as defined in claim 26, wherein said stream B further comprises up to 40% by weight of solid fillers and/or reinforcements.

53. A polymer as defined in claim 26, wherein said stream A further comprises up to 40% by weight of solid fillers and/or reinforcements.

54. A polymer as defined in claim 26, wherein said stream A further comprises a minor amount, between 0.001 and 10% by weight of said stream A, of an acid or acid precursor, selected from the group consisting of carboxylic acids, carboxylic acid anhydrides, sulfonic acids, sulfonic acid anhydrides, carbamic acid anhydrides, carbamoyl halides, carboxylic acid halides, and mixtures thereof.

55. A polymer as defined in claim 26, wherein said stream A consists essentially of at least 70% by weight of aromatic isocyanate species, not more than 30% by weight of solid reinforcing fillers, and not more than 10% of other optional additives.

56. A polymer as defined in claim 26, wherein said component B consists essentially of at least 65% by weight of a blend of ingredients B(i) and B(ii) in a weight ratio between 1:5 and 3:1, not more than 30% of solid reinforcing fillers, and not more than 20% of other optional ingredients.

57. A polymer as defined in claim 26, wherein said component (B)(i) is essentially free of elements other than C, H, and N, and contains at least one alkyl group of 1-4 carbon atoms ortho to each primary aromatic amine group.

58. A polymer as defined in claim 26, wherein said component (B)(ii) comprises greater than 7% by weight of the total polymer formulation.

59. A polymer as defined in claim 58, wherein said component (B)(ii) comprises between 20 and 60% of the total polymer formulation.

60. A polymer as defined in claim 58 wherein said component (B)(ii) comprises an aliphatic imine-terminated liquid resin based predominantly upon polyoxypropylene, has a molecular weight from 2000 to 6000, and has a number-averaged imine functionality from 2 to 3.

61. A polymer formed by a reaction injection molding process wherein at least two liquid streams (A) and (B) are impingement mixed, said streams comprising, respectively, the following reactants;
(A) an organic polyisocyanate having a number-averaged functionality of from about 1.9 to about 2.3 and a number-averaged molecular weight of from about 170 to about 800,
wherein more than 90 mole percent of the reactive isocyanate (—NCO) groups of said polyisocyanate are bonded directly to aromatic rings and at least 70 mole percent of the isocyanate-containing species comprising said polyisocyanate are diisocyanates: and
(B) a mixture comprising more than 55% by weight of the following isocyanate-reactive components
(i) an aromatic polyamine having a number-average functionality of aromatically bound primary and/or secondary amine groups of from 1.9 to 2.2, a number-averaged molecular weight of from 122 to 300, and wherein at least 95% of the amine groups are aromatically bound primary and/or secondary amines and at least 80 mole percent of the amine-containing species comprising said polyamine are diamines; and (ii) an imine-terminated aliphatic polyether having an average of from about 1.6 to about 3 imine

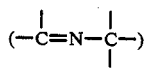

groups per molecule and a number-averaged molecular weight of from about 2000 to about 8000, wherein said imine groups constitute at least 70 mole percent of the isocyanate-reactive groups in the polyether, at least 70 mole percent of the imine-terminated species comprising said polyether are di-imines and/or tri-imines, and the polyether is substantially free of polyether species having a molecular weight less than 1500, the weight ratio of said reactant B(i) to said reactant B(ii) being in the range of 1:5 to 3:1, and wherein the relative amounts of said stream (A) and said stream (B) are such that said process is conducted at an isocyanate index between 0.70 and 1.50, thereby forming a polymer having a plurality of urea linkages.

62. A substantially moisture-free active hydrogen-containing composition comprising the following isocyanate-reactive components (i) an aromatic polyamine having a number-averaged functionality of aromatically bound primary and-/or secondary amine groups of from about 1.8 to about 3.0, a number-averaged molecular weight of from about 100 to about 400, and wherein at least 50 mole percent of the species comprising said polyamine are diamines; and (ii) an imine-terminated aliphatic polyether having an average of from about 1.1 to about 4 imine

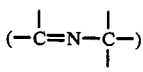

groups per molecule and a number-averaged molecular weight of from about 1500 to about 10,000, wherein said imine groups constitute at least 50 mole percent of isocyanate-reactive functional groups in said polyether and at least 50 mole percent of the imine-terminated species comprising said mixture are di-imines and/or tri-imines, the weight ratio of said reactant (i) to said reactant (ii) being in the range of about 9:1 to about 1:9.

63. A composition as defined in claim 62, comprising at least 55 weight percent of component (i) and component (ii).

64. A composition as defined in claim 62, wherein the weight ratio of component (i) to component (ii) is between 1:5 and 3:1.

65. A composition as defined in claim 62, wherein said aromatic polyamine has a number-averaged functionality between 1.9 and 2.2.

66. A composition as defined in claim 62, wherein said aromatic polyamine has a number-averaged molecular weight between 122 and 300.

67. A composition as defined in claim 62, wherein at least 95 mole percent of the amine groups in said polyamine are aromatically bound.

68. A composition as defined in claim 62, wherein at least 95% of the species comprising said polyamine contain two aromatically bound primary and/or secondary amine groups.

69. A composition as defined in claim 62, wherein at least 85 mole percent of the aromatic amine groups within said polyamine composition are primary amines.

70. A composition as defined in claim 62, wherein said aliphatic polyether contains an average of about 1.6 to about 3 imine groups per molecule.

71. A composition as defined in claim 62, wherein all atoms bonded directly to said polyether reactant at an imine nitrogen or imine carbon atom are fully saturated carbon atoms.

72. A composition as defined in claim 62, wherein said imine-terminated polyether has an number-averaged molecular weight between 2000 and 8000 and is substantially free of imine-containing polyethers having a molecular weight less than 1500.

73. A composition as defined in claim 62, wherein imine groups comprise at least 70 mole percent of isocyanate-reactive functional groups present in said imine-terminated polyether.

74. A composition as defined in claim 62, wherein at least 70 mole percent of said aliphatic imine-terminated polyether consists of di-imines and/or tri-imines.

75. A composition as defined in claim 62, further comprising, relative to the combined total weight of components (i) and (ii), between 0.1 and 40% (w/w) of imine-containing aliphatic species having a molecular weight less than 1500.

76. A composition as defined in claim 75, wherein said imine-containing aliphatic species has a number averaged molecular weight less than 800 and a number averaged aliphatic imine group functionality between 1.8 and about 2.8.

77. A composition as defined in claim 62, further comprising between 0.1 and 40% (w/w), relative to the combined total weight of (i) and (ii), an aliphatic amine having a molecular weight less than about 1800 and a number-averaged functionality of primary and/or secondary amine groups between about 1 and about 3.

78. A composition as defined in claim 62, further comprising a minor amount, between 0.1 and 40% by weight relative to the total combined weight of components (i) and (ii), of organic hydroxyl containing species.

79. A composition as defined in claim 62, further comprising between 0.001 and 10% by weight of one or more additives selected from urethane catalysts, carboxylic acids, sulfonic acids, mineral acids, internal mold release agents, plasticizers, surfactants, fire retardants, and coupling agents.

80. A composition as defined in claim 62, further comprising up to 40% by weight of solid fillers and/or reinforcements.

81. A composition as defined in claim 62, consisting essentially of at least 68% by weight of a blend of ingredients (i) and (ii) in a weight ratio between 1:3 and 3:1, not more than 30% of solid reinforcing fillers, and not more than 20% of other optional ingredients.

82. A composition as defined in claim 62, wherein said aromatic polyamine is essentially free of elements other than C, H, and N, and contains at least one alkyl group of 1–4 carbon atoms ortho to aach primary aromatic amine group.

83. A composition as defined in claim 62 wherein said component (ii) comprises an aliphatic imine-terminated liquid resin based predominantly upon polyoxpropylene, has a molecular weight from 2000 to 9000, and has a number-averaged imine functionality from 2 to 3.

84. A polyoxyalkylene resin terminated with imino functionalities, said resin having a number-averaged molecular weight of from about 200 to about 10,000, a number-averaged imino functionality of about 1.0 to about 4.0, and wherein said imino functionalities are directly reactive toward isocyanate groups.

85. A resin as defined in claim 84, wherein said imino functionalities are simple imine groups.

86. A resin as defined in claim 84, comprising oxypropylene groups.

87. A resin as defined in claim 84, wherein said resin has a molecular weight of at least 1500.

88. A reaction system as defined in claim 1, wherein said component B contains as imino-functional compound, a fully substituted aliphatic guanidine compound.

89. A polymer, in the form of a molded article, prepared from the reaction system of claim 88 by a RIM process.

90. A reaction system as defined in claim 3, wherein said imino-functional polyether resin is a simple imine derivative made by reacting aliphatic mono and/or polyamines with at least one member selected from the group consisting of acetone, cyclohexanone, methyl ethyl ketone, methyl n-propyl ketone, diethyl ketone, methyl isopropyl ketone, benzyl methyl ketone, formaldehyde, acetaldehyde, propionaldehyde, n-butyraldehyde, isobutraldehyde, heptaldehyde, α-methylvaleraldehyde, α-methyvaleraldehyde, caproaldehyde, isocaproaldehyde, cyclohexyl aldehyde, and mixture thereof.

91. A resin as defined in claim 84, having imino groups selected from

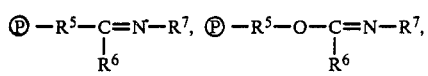

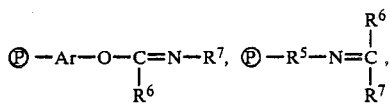

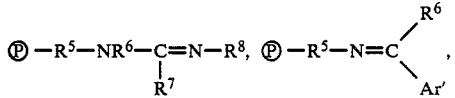

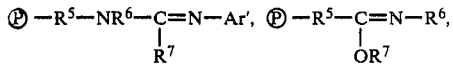

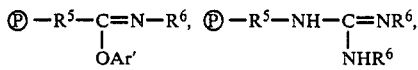

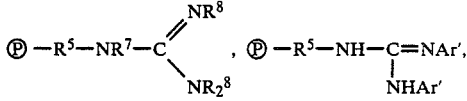

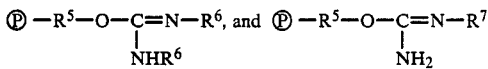

wherein:
$R^5$ and Ar are divalent aliphatic and aromatic organic linking groups, respectively;

Ⓟ represents a polyether chain or radical, to which said imino (C≡N) functional group is attached;

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

* * * * *